(12) United States Patent
Ohashi et al.

(10) Patent No.: US 10,730,516 B2
(45) Date of Patent: Aug. 4, 2020

(54) SADDLED VEHICLE

(71) Applicant: KABUSHIKI KAISHA F.C.C., Hamamatsu-shi, Shizuoka (JP)

(72) Inventors: Tatsuyuki Ohashi, Hamamatsu (JP); Kazuyoshi Miyachi, Hamamatsu (JP)

(73) Assignee: KABUSHIKI KAISHA F.C.C., Hamamatsu-shi (JP)

( * ) Notice: Subject to any disclaimer, the term of this patent is extended or adjusted under 35 U.S.C. 154(b) by 502 days.

(21) Appl. No.: 15/424,307

(22) Filed: Feb. 3, 2017

(65) Prior Publication Data

US 2017/0144665 A1 May 25, 2017

Related U.S. Application Data

(63) Continuation of application No. PCT/JP2015/072114, filed on Aug. 4, 2015.

(30) Foreign Application Priority Data

Aug. 4, 2014 (JP) ................................ 2014-158913

(51) Int. Cl.
*B60W 30/16* (2020.01)
*B62J 99/00* (2020.01)
(Continued)

(52) U.S. Cl.
CPC .......... *B60W 30/16* (2013.01); *B60W 30/165* (2013.01); *B60W 40/04* (2013.01);
(Continued)

(58) Field of Classification Search
CPC .......... B60Y 2200/12; B60Y 2200/126; B62K 2207/00; B60W 30/143; B60W 30/16;
(Continued)

(56) References Cited

U.S. PATENT DOCUMENTS

| 2003/0004633 A1* | 1/2003 | Russell | H01Q 1/3233 701/96 |
| 2009/0125160 A1* | 5/2009 | Desai | B60N 2/01 701/1 |
| 2013/0133457 A1* | 5/2013 | Sakamoto | F16H 59/02 74/473.12 |

FOREIGN PATENT DOCUMENTS

| JP | H05-341843 | 12/1993 |
| JP | H10-338055 | 12/1998 |

(Continued)

OTHER PUBLICATIONS

JP 2009-116882 english translation.*

(Continued)

*Primary Examiner* — Tuan C To
*Assistant Examiner* — Paul A Castro
(74) *Attorney, Agent, or Firm* — Knobbe, Martens, Olson & Bear LLP

(57) ABSTRACT

A saddled vehicle driven by a driver can include a detection device and a cruise control device for judging the other vehicles detected by the detection device and traveling in a same traffic lane as the own vehicle's traffic lane as a preceding vehicle and for automatically controlling travel of the vehicle driven by the driver so that the vehicle driven by the driver follows the preceding vehicle and keeps a preset intervehicular distance relative to the preceding vehicle. The cruise control device can obtain a forward intervehicular distance which is a distance from the vehicle driven by the driver to the preceding vehicle in a traveling direction and a side intervehicular distance which is a distance from the vehicle driven by the driver to the preceding vehicle in a vehicle width direction and can perform the automatic travel control of the vehicle driven by the driver in accordance with the forward intervehicular distance and the side intervehicular distance.

17 Claims, 30 Drawing Sheets

(51) Int. Cl.
*F02D 29/02* (2006.01)
*B60W 30/165* (2020.01)
*B60W 40/04* (2006.01)
*G08G 1/16* (2006.01)
*B62J 27/00* (2020.01)
*B62J 45/20* (2020.01)
*B62J 45/40* (2020.01)

(52) U.S. Cl.
CPC ............ *B62J 99/00* (2013.01); *F02D 29/02* (2013.01); *G08G 1/166* (2013.01); *B60W 2300/36* (2013.01); *B60W 2420/42* (2013.01); *B60W 2552/15* (2020.02); *B60W 2552/30* (2020.02); *B60W 2554/4041* (2020.02); *B60W 2554/801* (2020.02); *B60W 2554/804* (2020.02); *B60W 2710/02* (2013.01); *B60W 2720/10* (2013.01); *B60W 2754/10* (2020.02); *B60W 2754/30* (2020.02); *B62J 27/00* (2013.01); *B62J 45/20* (2020.02); *B62J 45/40* (2020.02)

(58) Field of Classification Search
CPC ......... B60W 2720/10; B60W 2420/42; B60W 2550/308; B60W 40/04; B60W 2420/52; B60W 2540/10; B60W 2750/308; B60W 10/04; B60W 2300/36; B60W 2550/302; B60W 30/165; B60W 2550/306; B60W 30/146; B60W 2520/10; B60W 2750/306; B60W 30/14; B60W 10/10; B60W 2550/10; B60W 2720/106; B60W 2750/30; B62J 2099/0013; G08G 1/163
See application file for complete search history.

(56) References Cited

FOREIGN PATENT DOCUMENTS

| | | | | |
|---|---|---|---|---|
| JP | H11-213300 | 8/1999 | | |
| JP | 2000-057496 | 2/2000 | | |
| JP | 2004-189142 | 7/2004 | | |
| JP | 2005-119522 | 5/2005 | | |
| JP | 2006-007850 | 1/2006 | | |
| JP | 2006-088771 | 4/2006 | | |
| JP | 2009-008267 | 1/2009 | | |
| JP | 2009-116882 | 5/2009 | | |
| JP | 2009116882 A | * 5/2009 | ............ | G08G 1/166 |
| JP | 2011-084105 | 4/2011 | | |
| JP | 2012-237206 | 12/2012 | | |
| JP | 2014-051241 | 3/2014 | | |
| WO | WO2006/137545 | 12/2006 | | |

OTHER PUBLICATIONS

English machine translation (Espacenet) of JP-2009116882-A, Ketter Wolfgang (Year: 2009).*
International Search Report for International Application No. PCT/JP2015/072114 dated Nov. 10, 2015, in 2 pages.

* cited by examiner

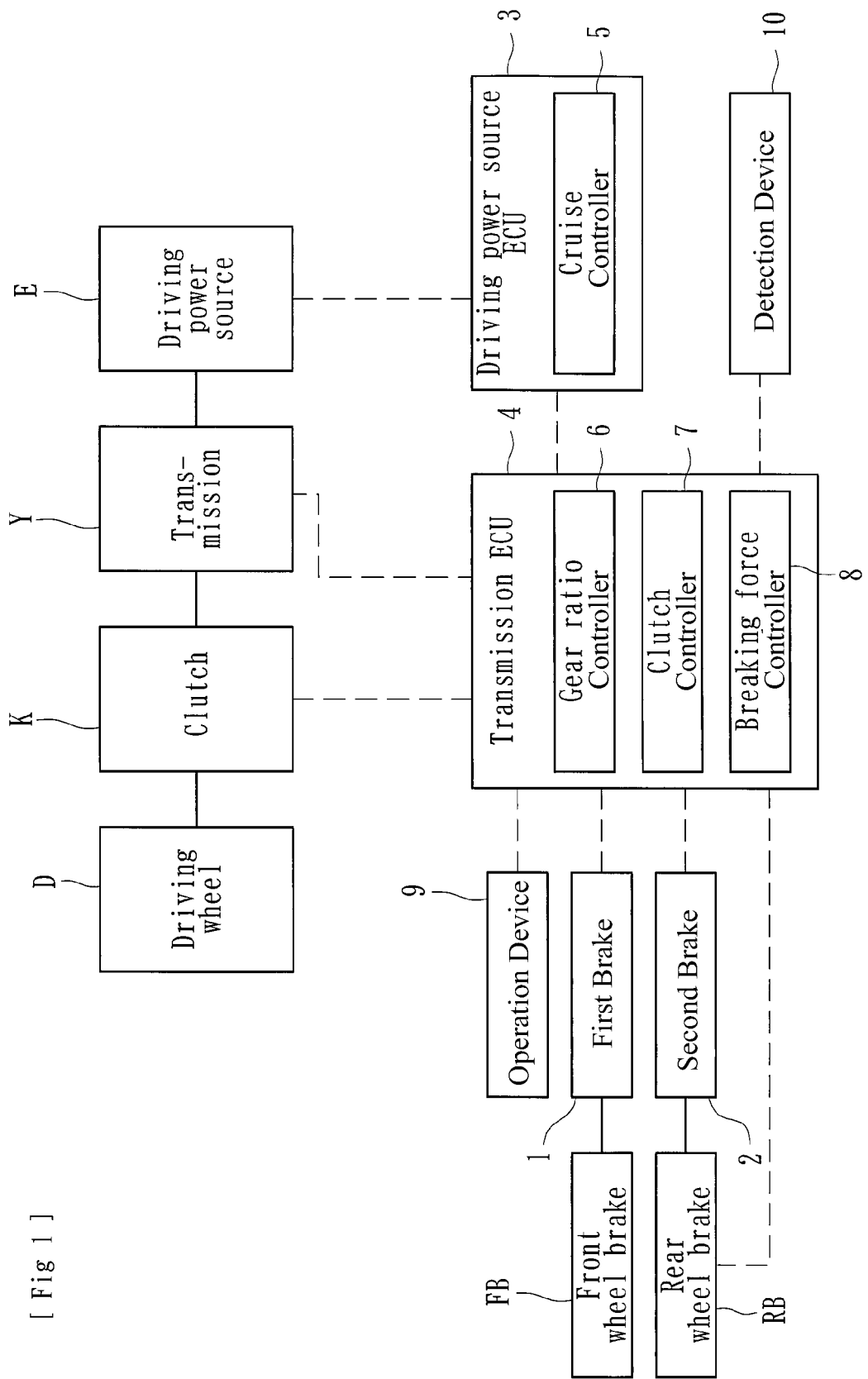
[Fig 1]

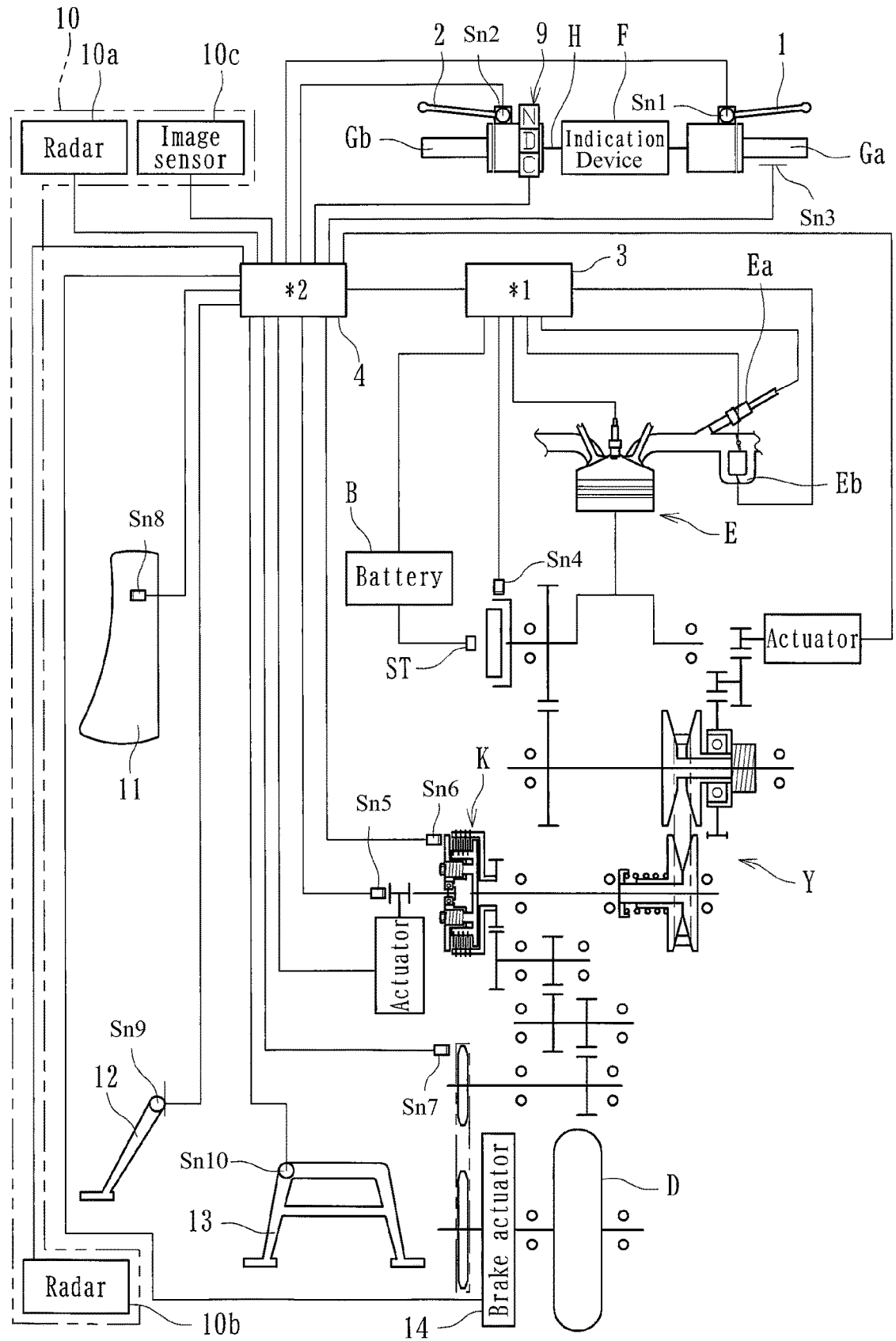
[Fig 2]

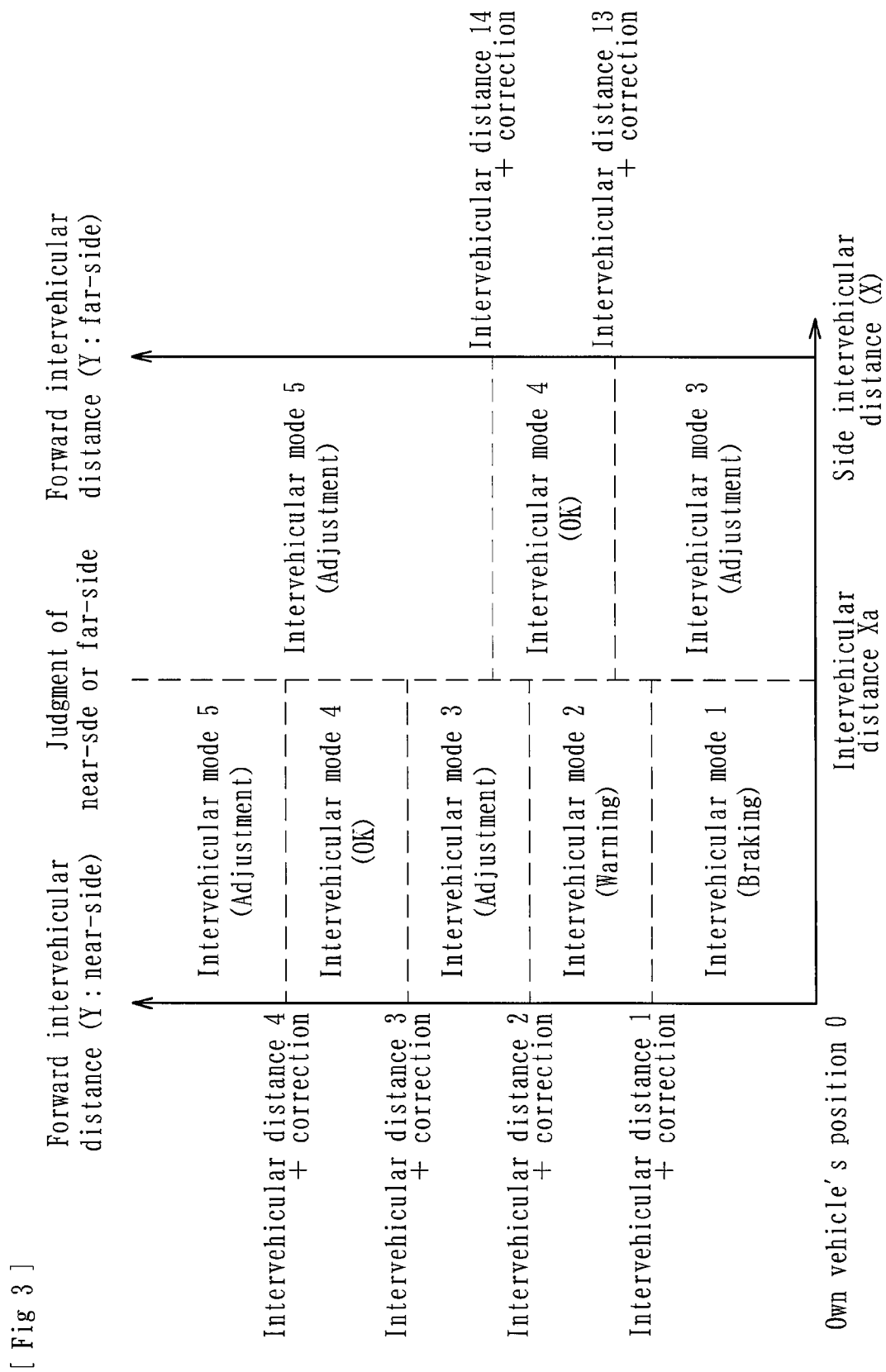
[Fig 3]

[Fig 4]
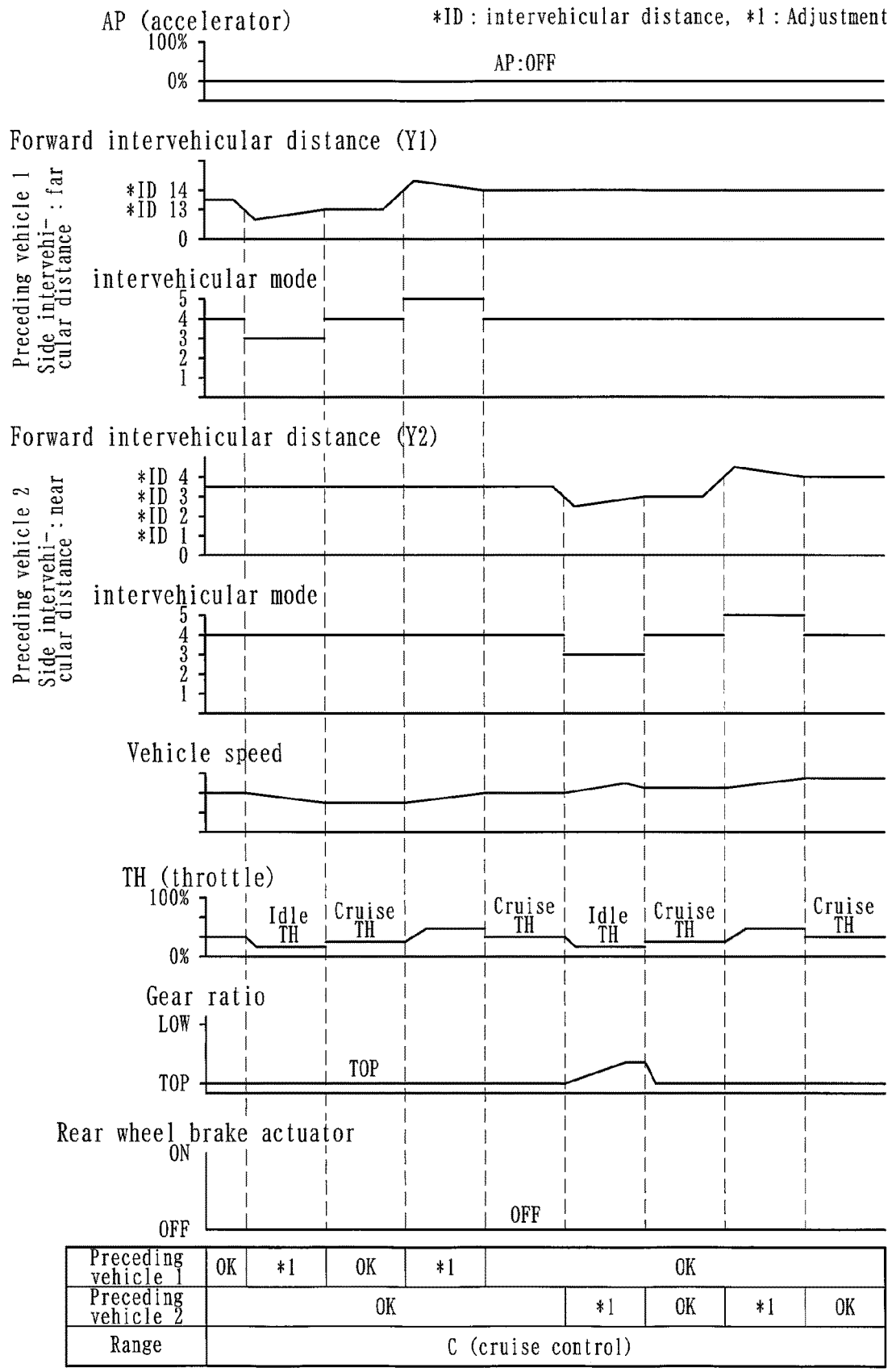

[Fig 5]
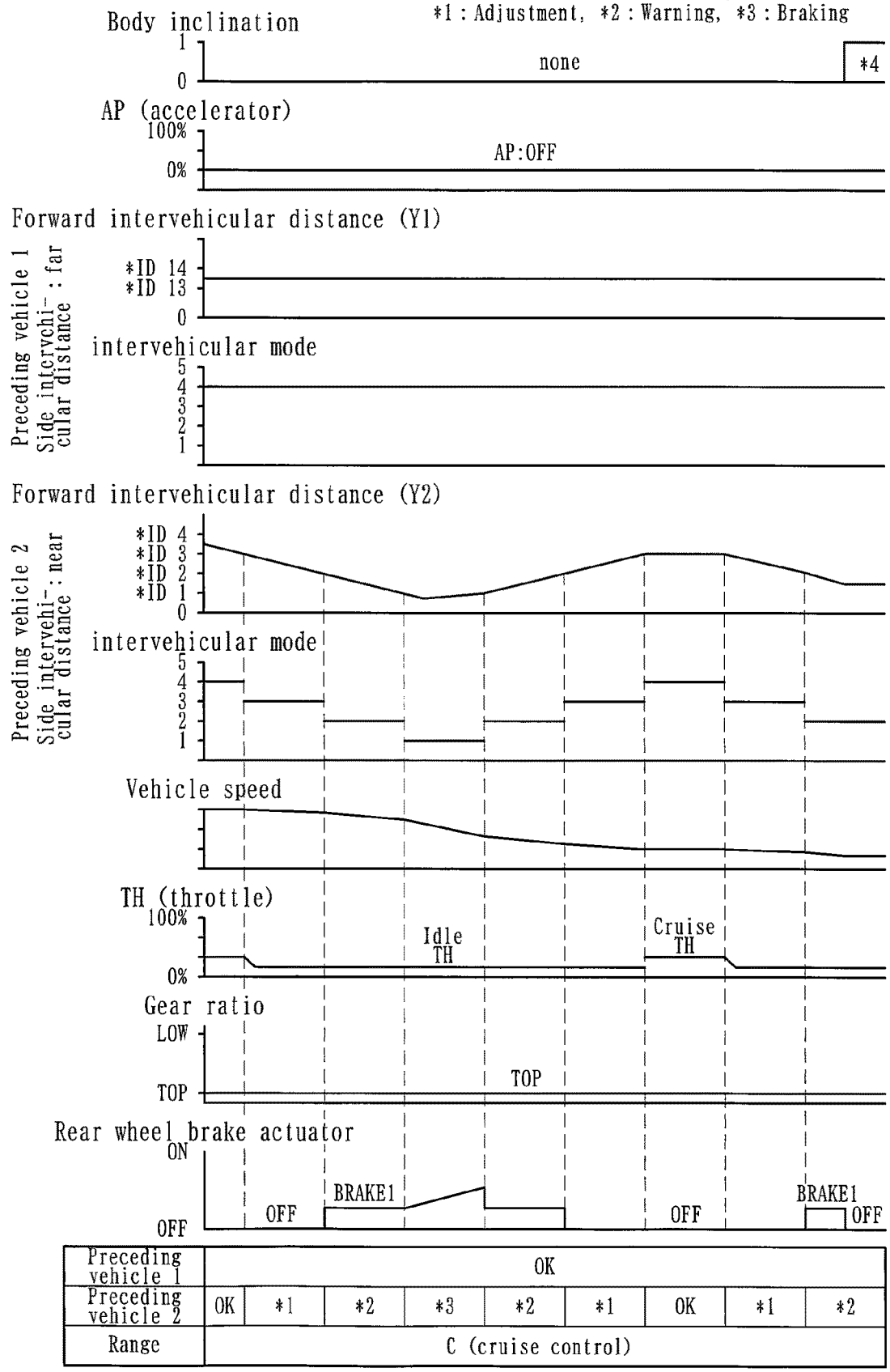

[Fig 6]
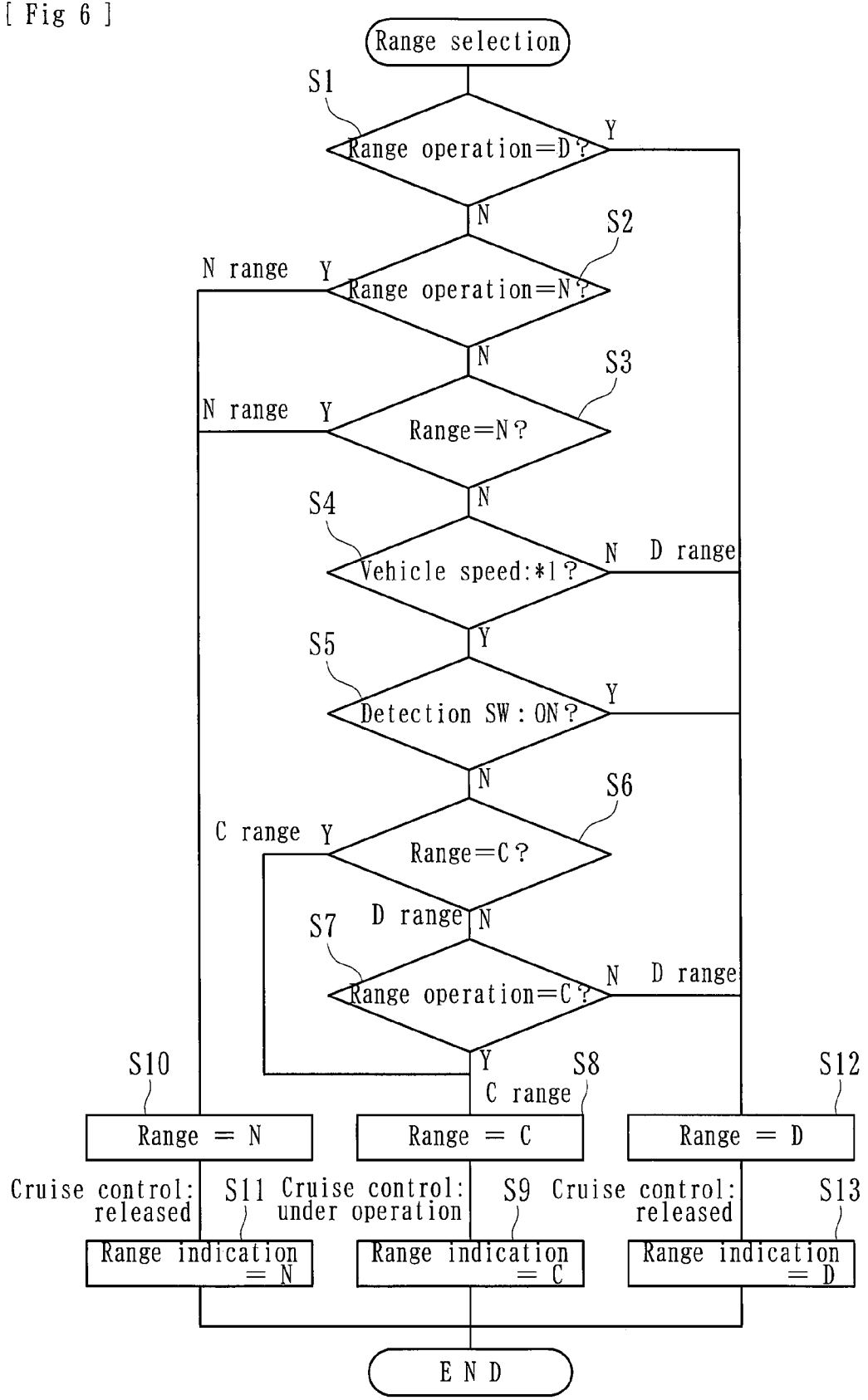

[Fig 7]
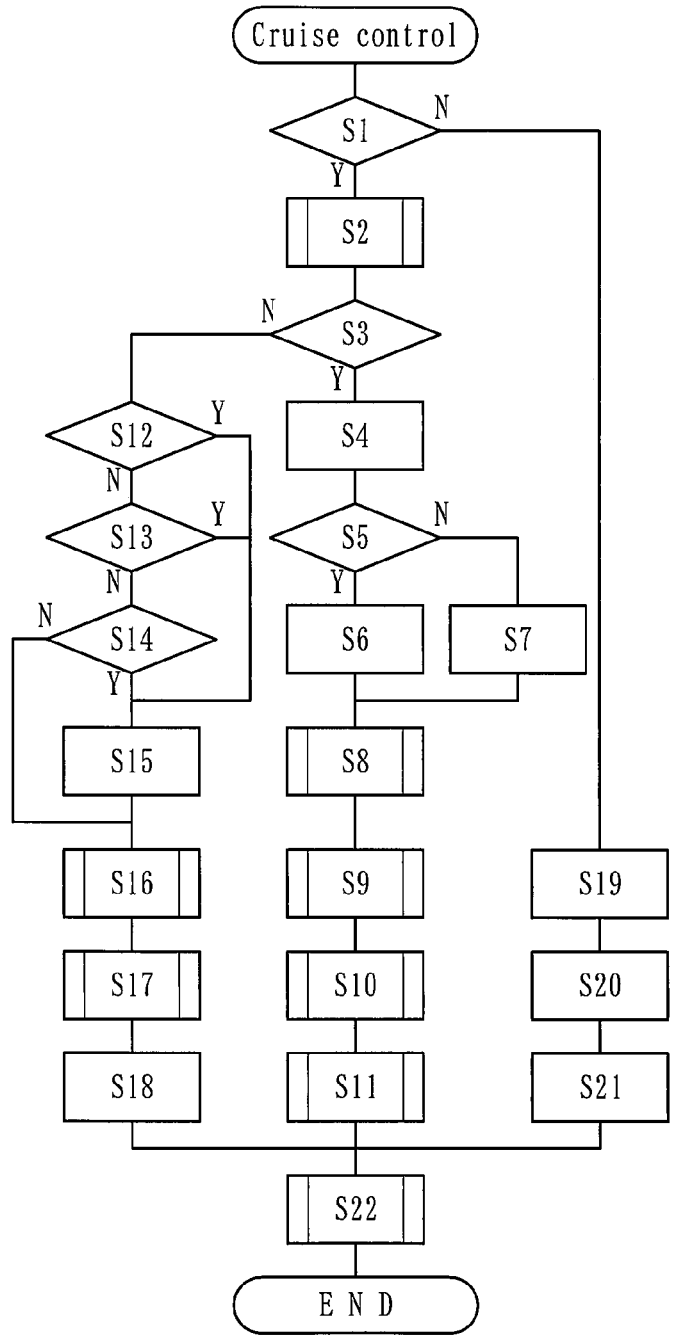

[Fig 8]
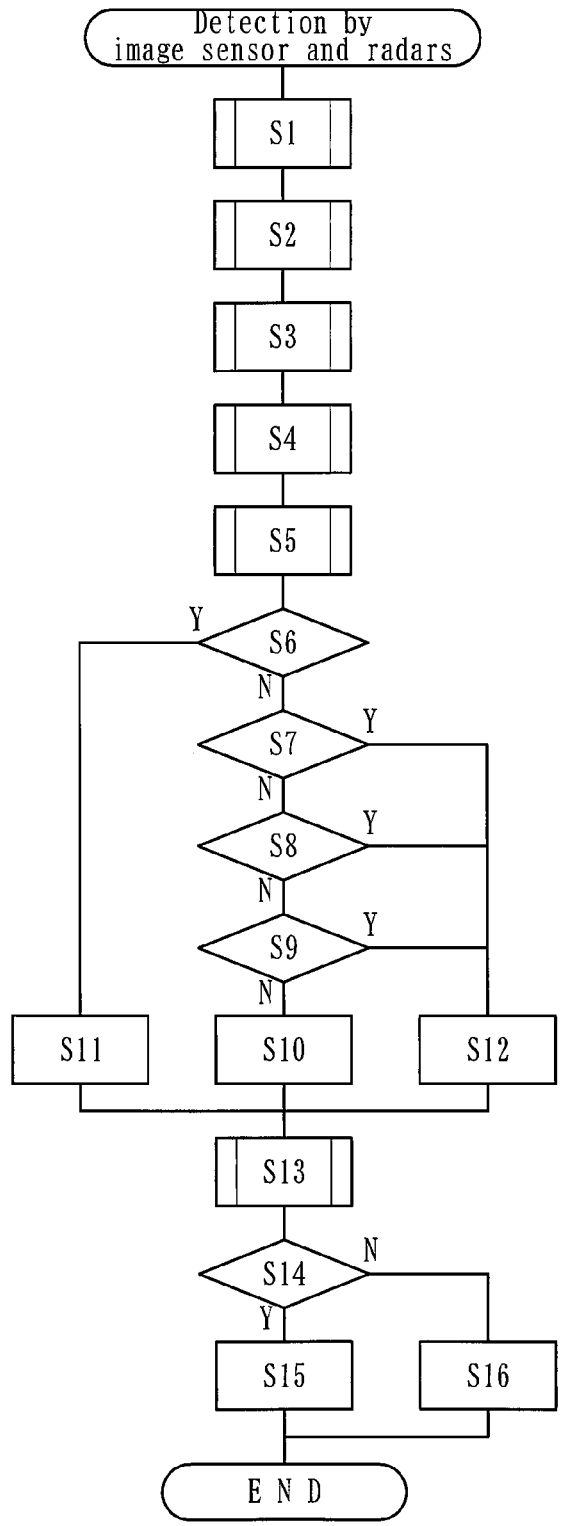

[Fig 9]
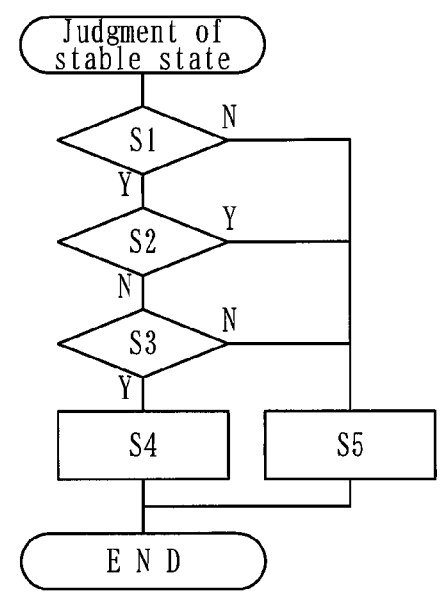

[Fig 10]
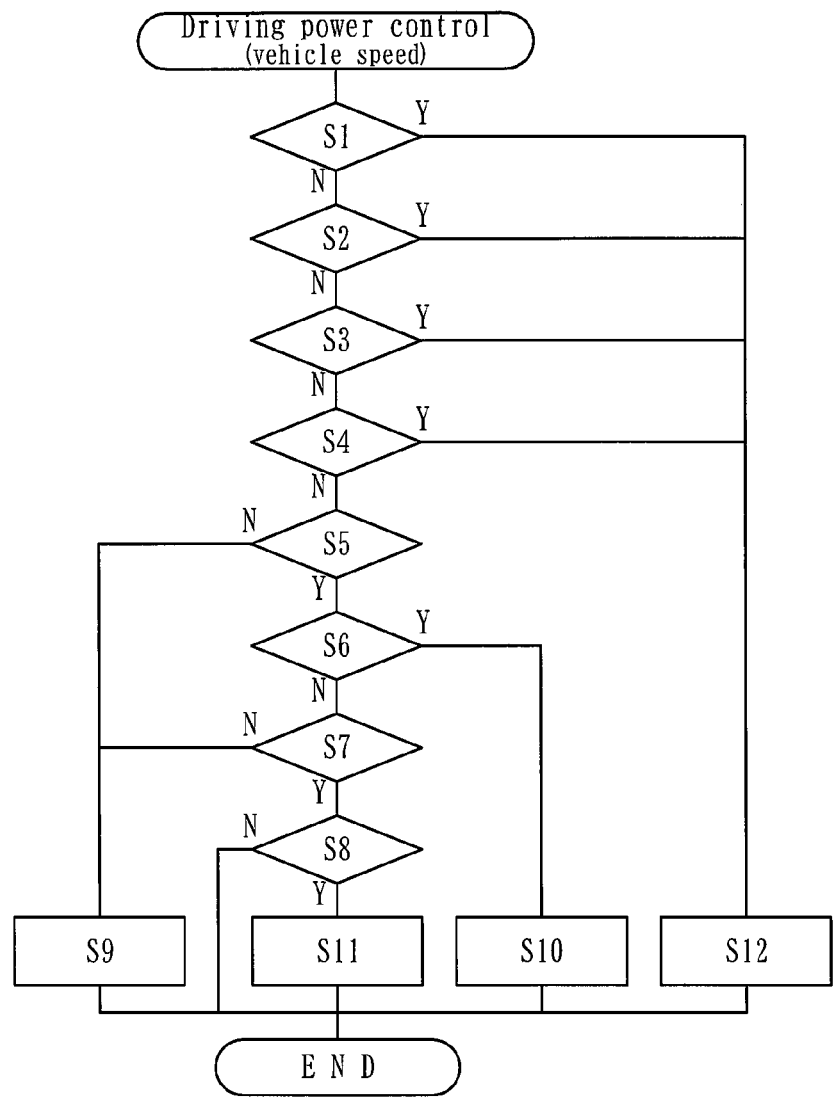

[Fig 11]
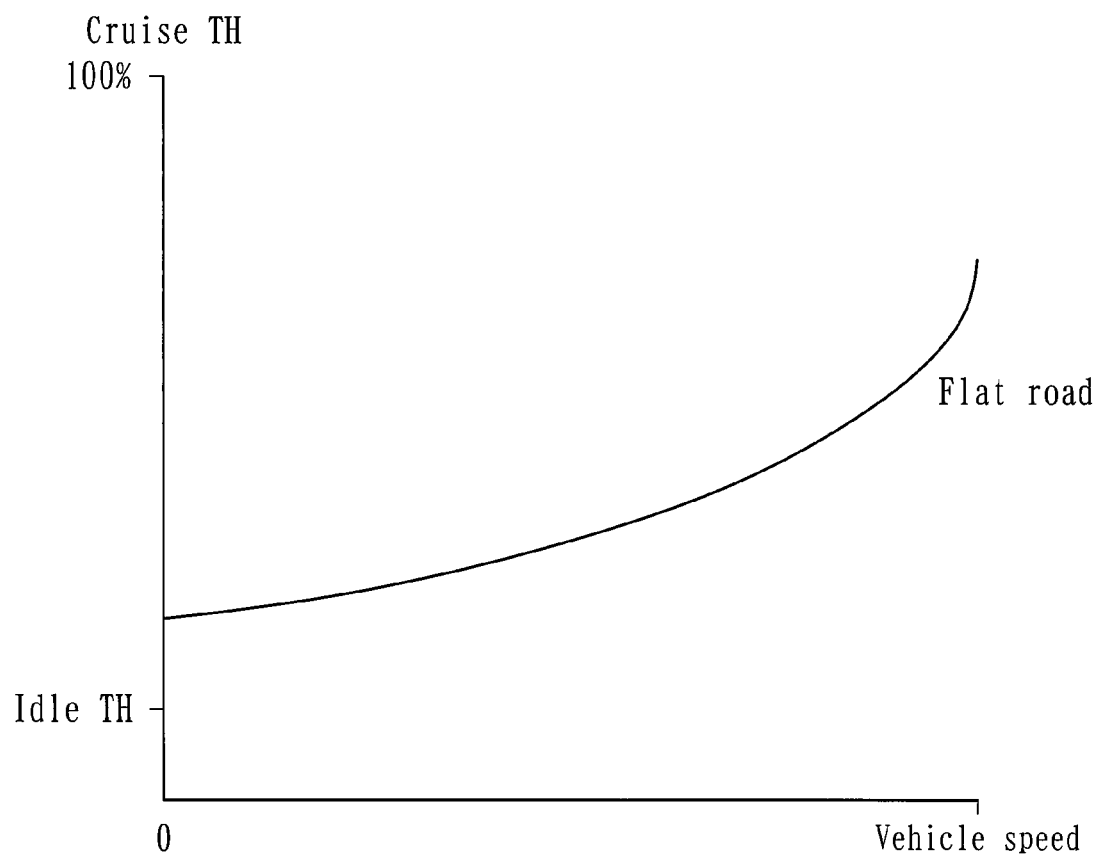
[Fig 12]
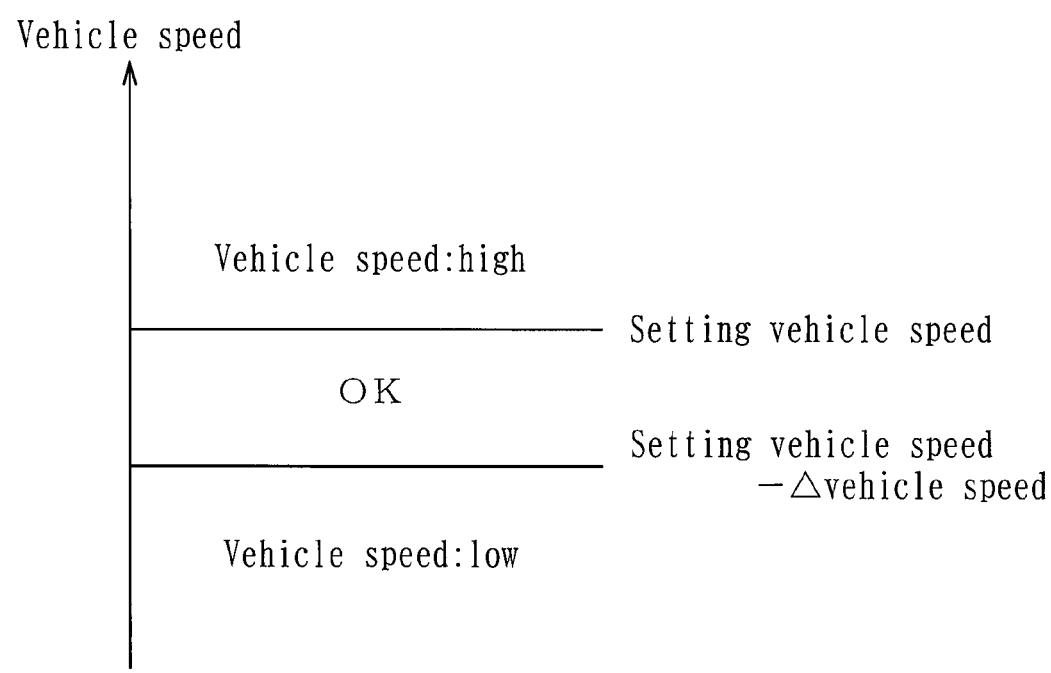

[Fig 13]
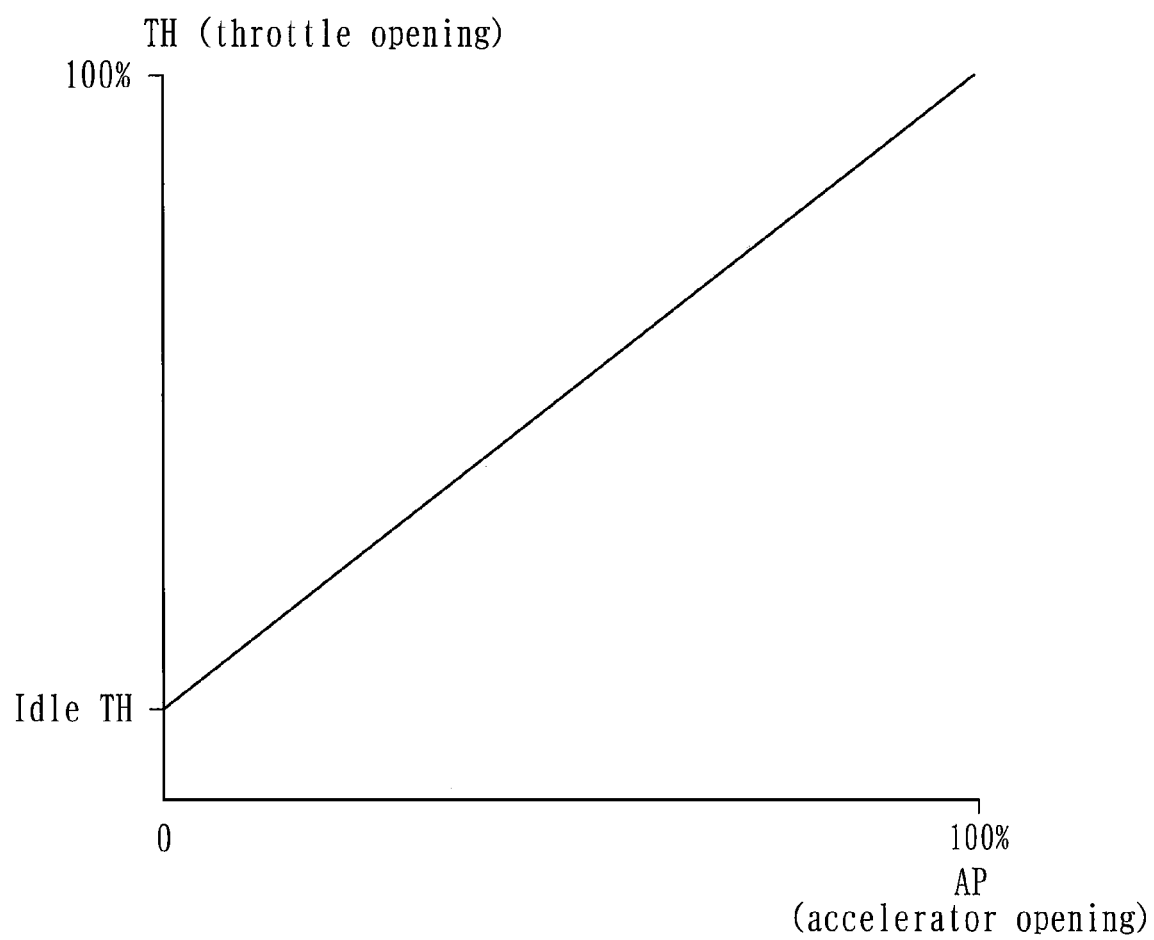

[Fig 14]
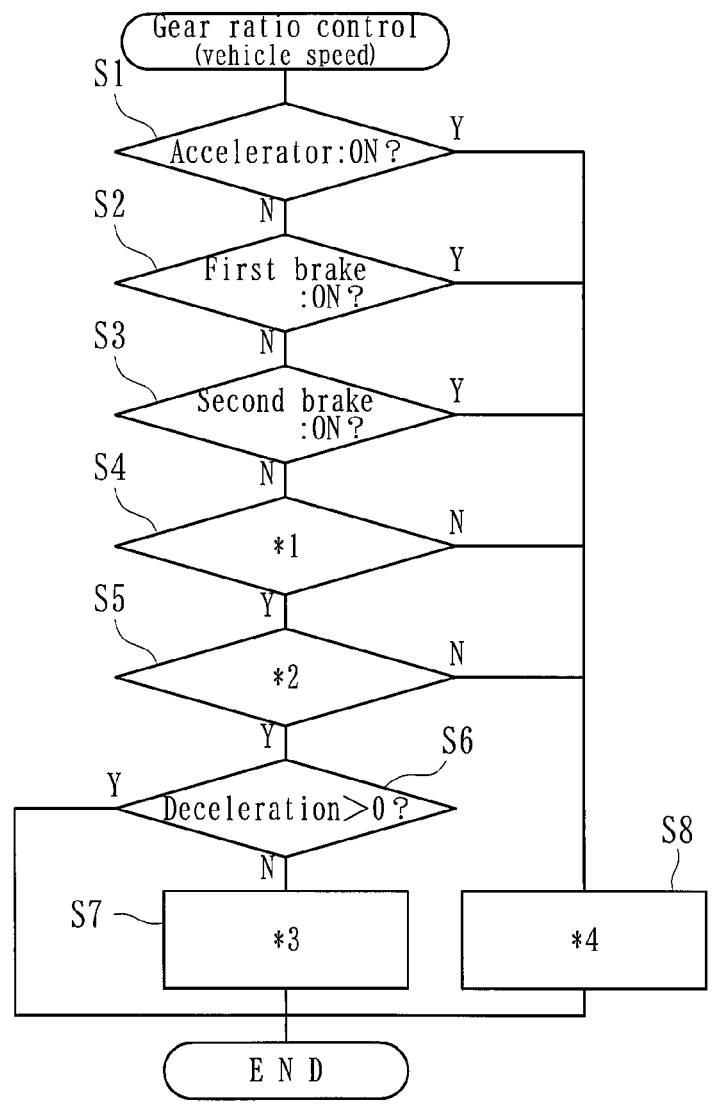

[Fig 15]
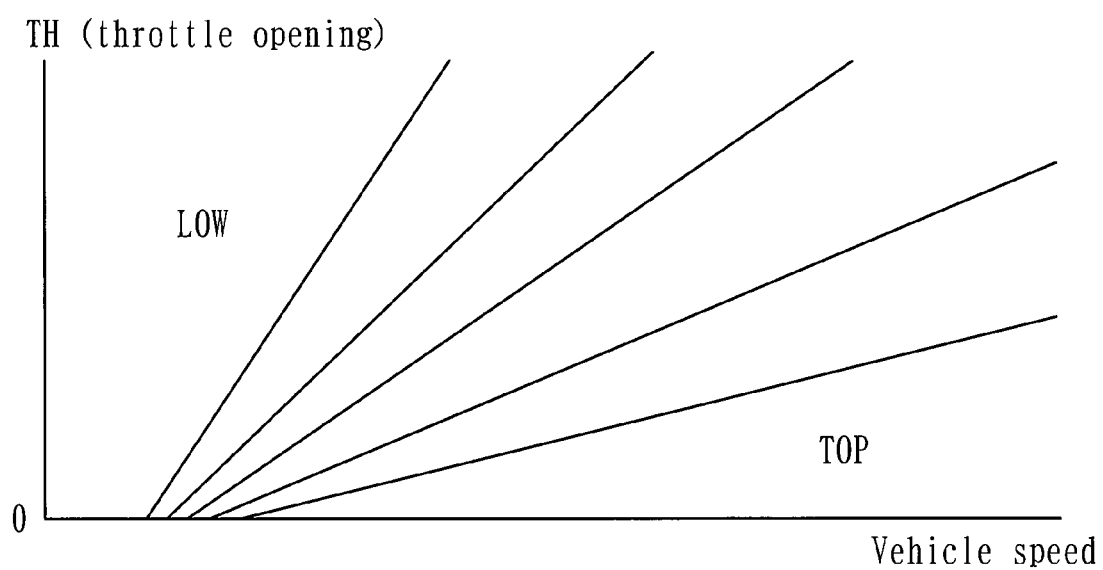

[Fig 16]
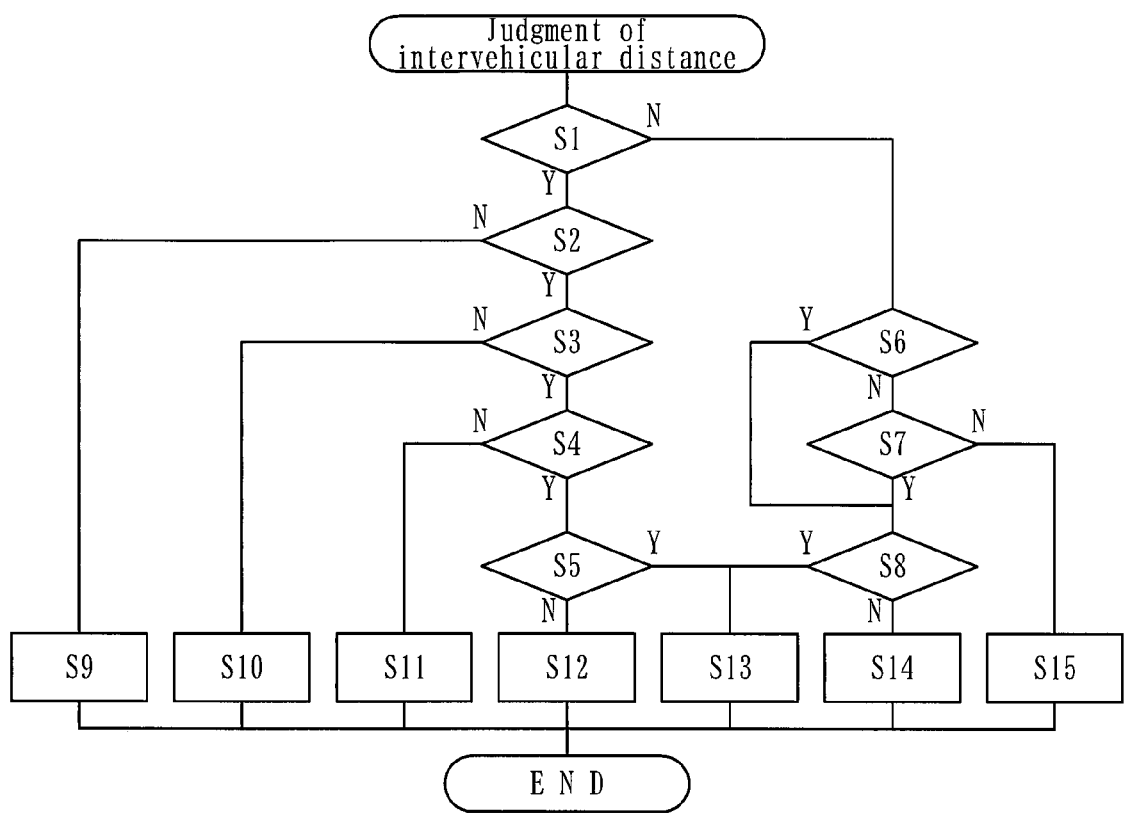

[Fig 17]
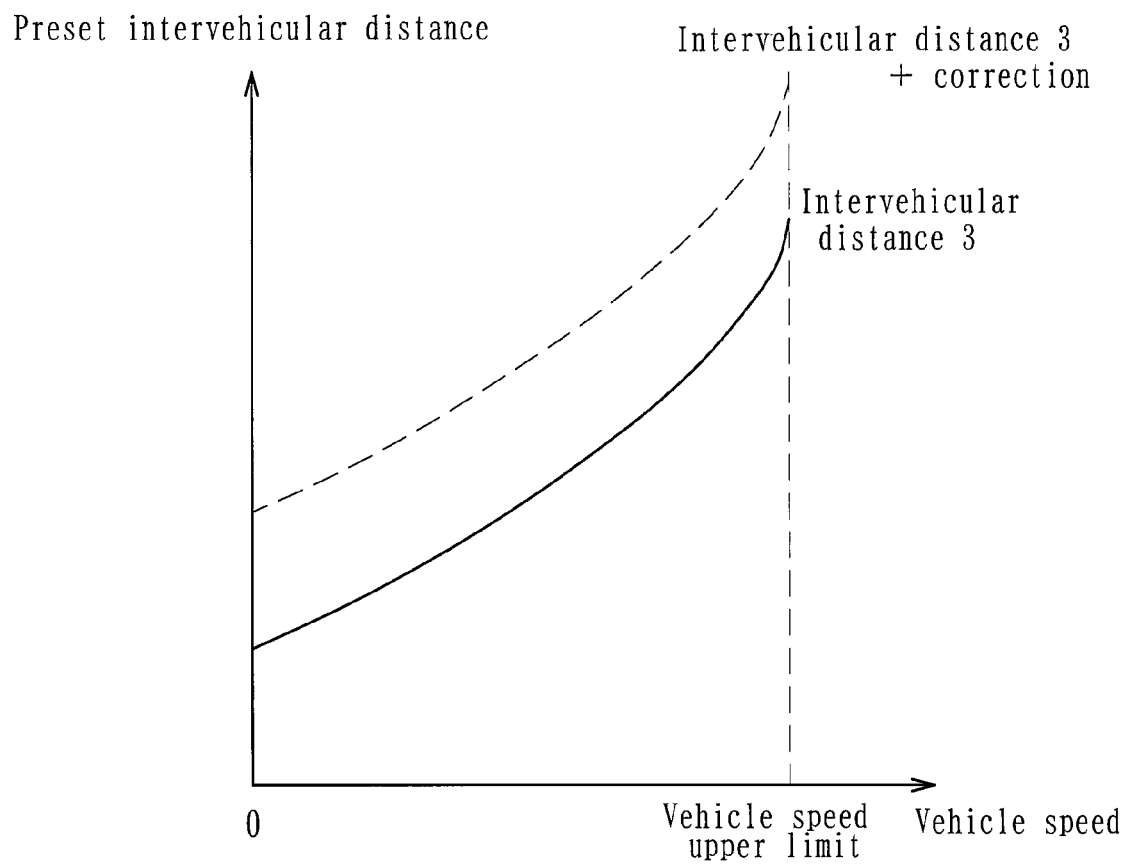

[Fig 18]
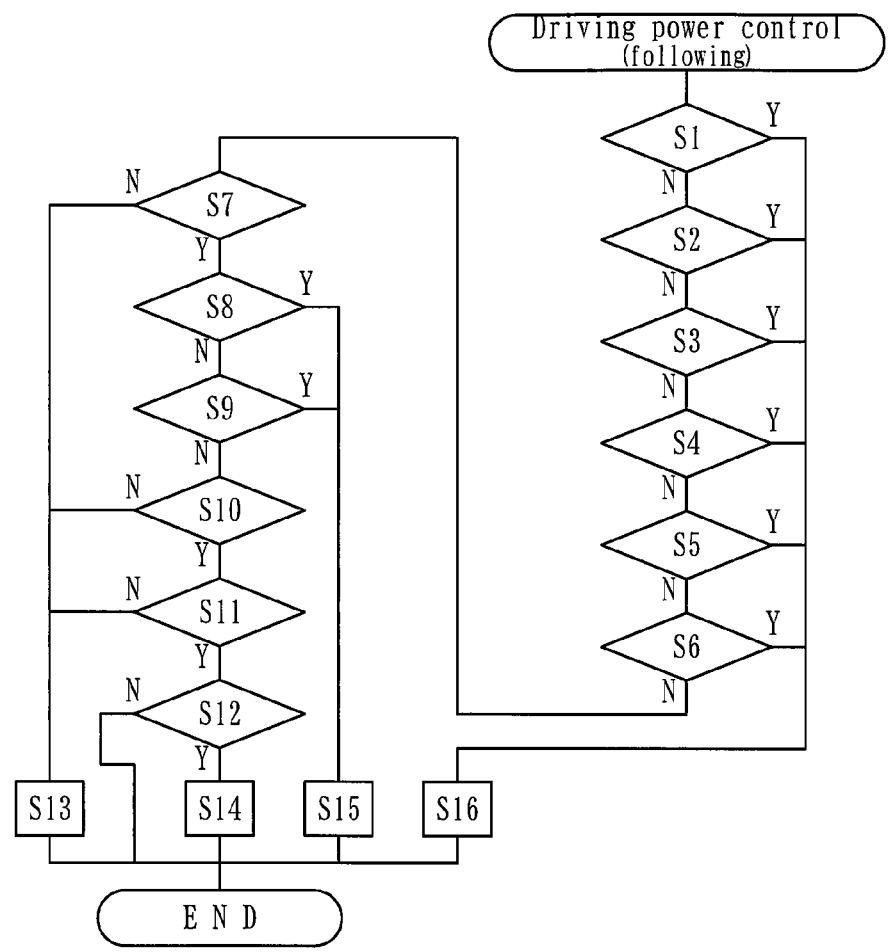

[Fig 19]

| Throttle opening | | Second preceding vehicle, intervehicular mode | | | | |
|---|---|---|---|---|---|---|
| | | 1 | 2 | 3 | 4 | 5 |
| | | Approaching | Warning | Adjustment | OK | Adjustment |
| First preceding vehicle, intervehicular mode | 1 Approaching | Idle TH | | | | |
| | 2 Warning | | | | | |
| | 3 Adjustment | | | Subtruction | Keeping | Addition |
| | 4 OK | | | | | |
| | 5 Adjustment | | | | | |

[Fig 20]
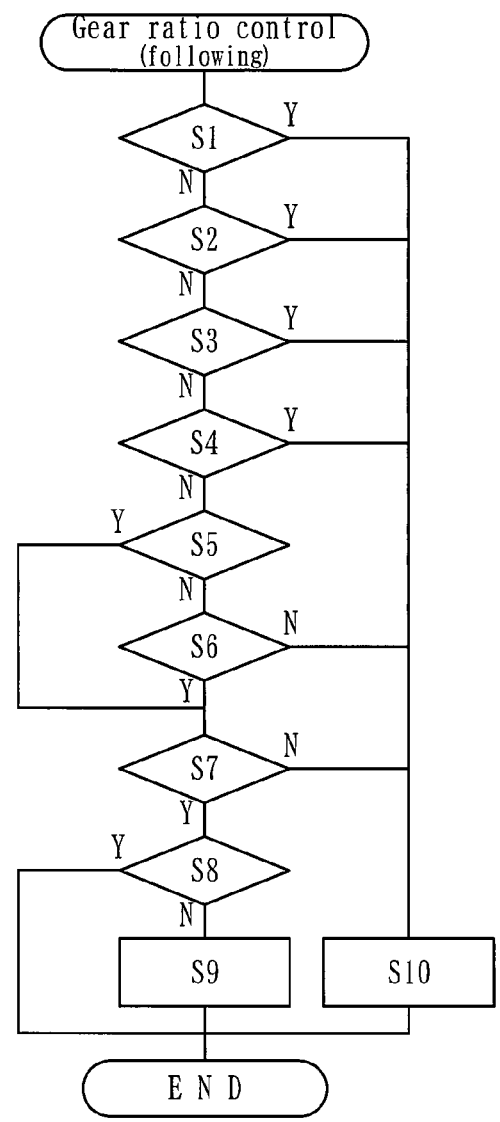

[Fig 21]

| Gear ratio | | Second preceding vehicle, intervehicular mode | | | | |
|---|---|---|---|---|---|---|
| | | 1 | 2 | 3 | 4 | 5 |
| | | Approaching | Warning | Adjustment | OK | Adjustment |
| First preceding vehicle, intervehicular mode | 1 Approaching | When throttle opening < predetermined TH & deceleration ≦ 0, ratio addition (engine brake) | | | | |
| | 2 Warning | | | | | |
| | 3 Adjustment | | | | | |
| | 4 OK | | | | Gear ratio MAP | |
| | 5 Adjustment | | | | | |

[Fig 22]
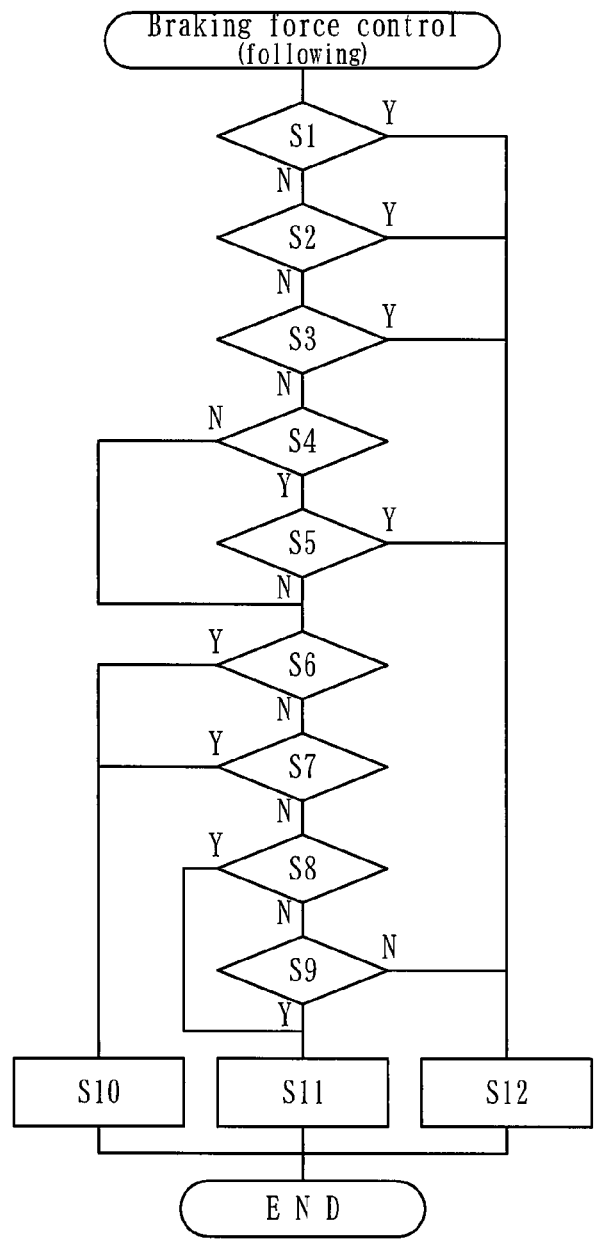

[ Fig 23 ]
| Braking force | | Second preceding vehicle, intervehicular mode | | | | |
|---|---|---|---|---|---|---|
| | | 1 Approaching | 2 Warning | 3 Adjustment | 4 OK | 5 Adjustment |
| First preceding vehicle, intervehicular mode | 1 Approaching | Brake addition | Weak braking | Brake actuator operation : none | | |
| | 2 Warning | | | | | |
| | 3 Adjustment | | | | | |
| | 4 OK | | | | | |
| | 5 Adjustment | | | | | |
[ Fig 24 ]
Braking force of brake actuator
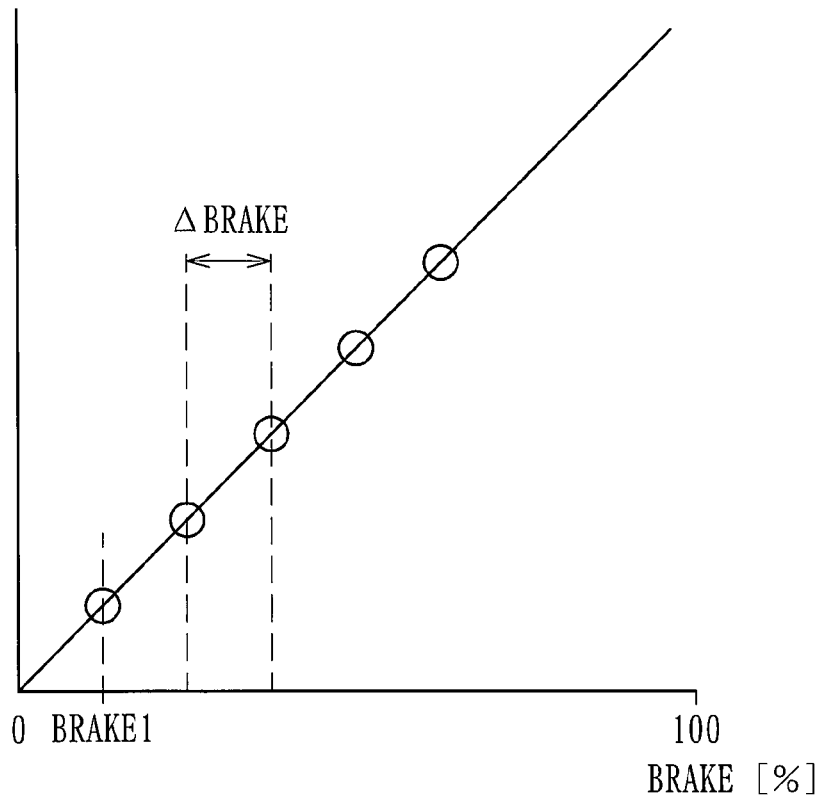

[Fig 25]
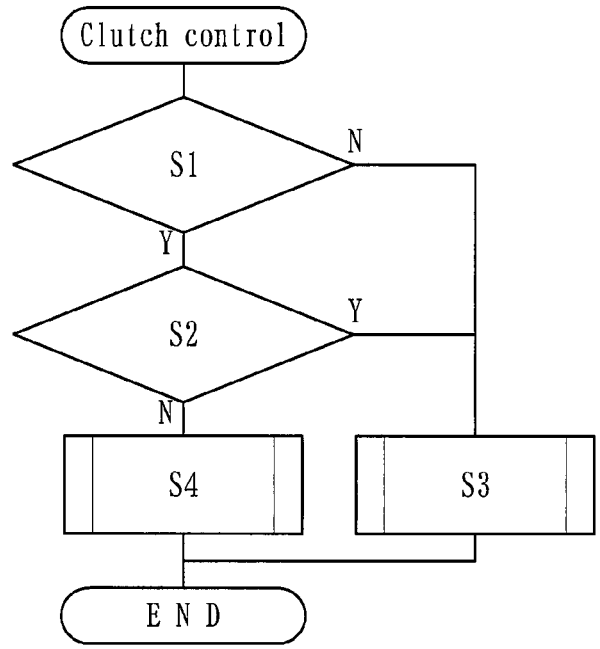
[Fig 26]
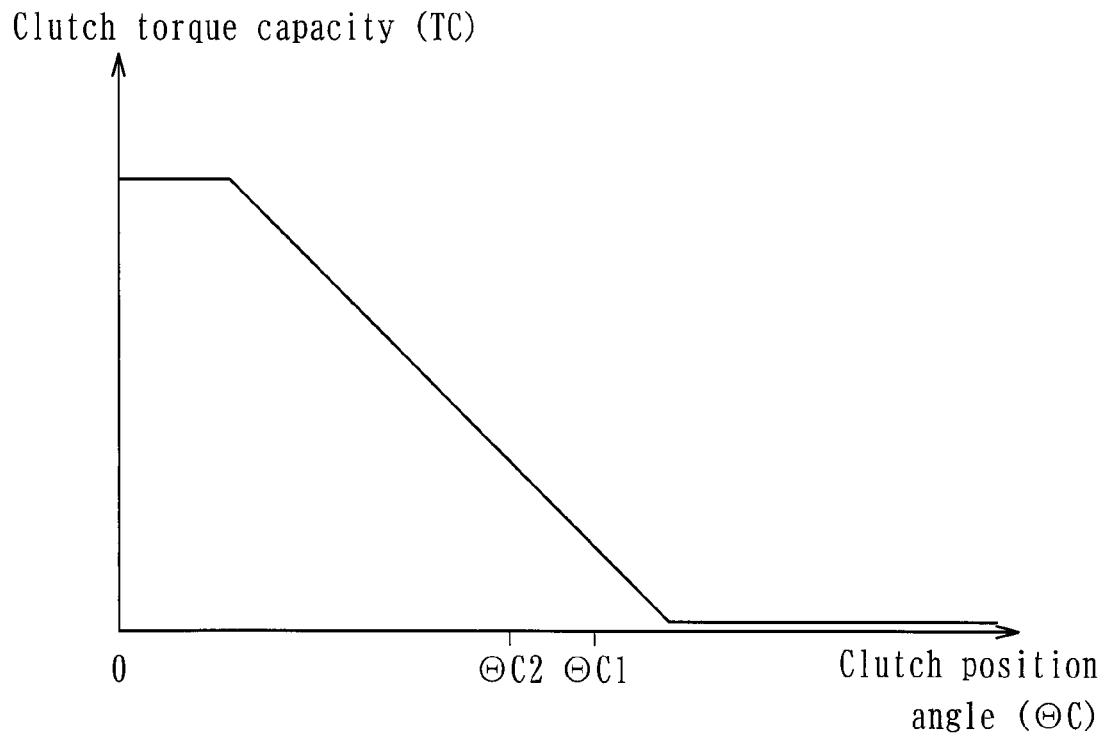

[ Fig 27 ]
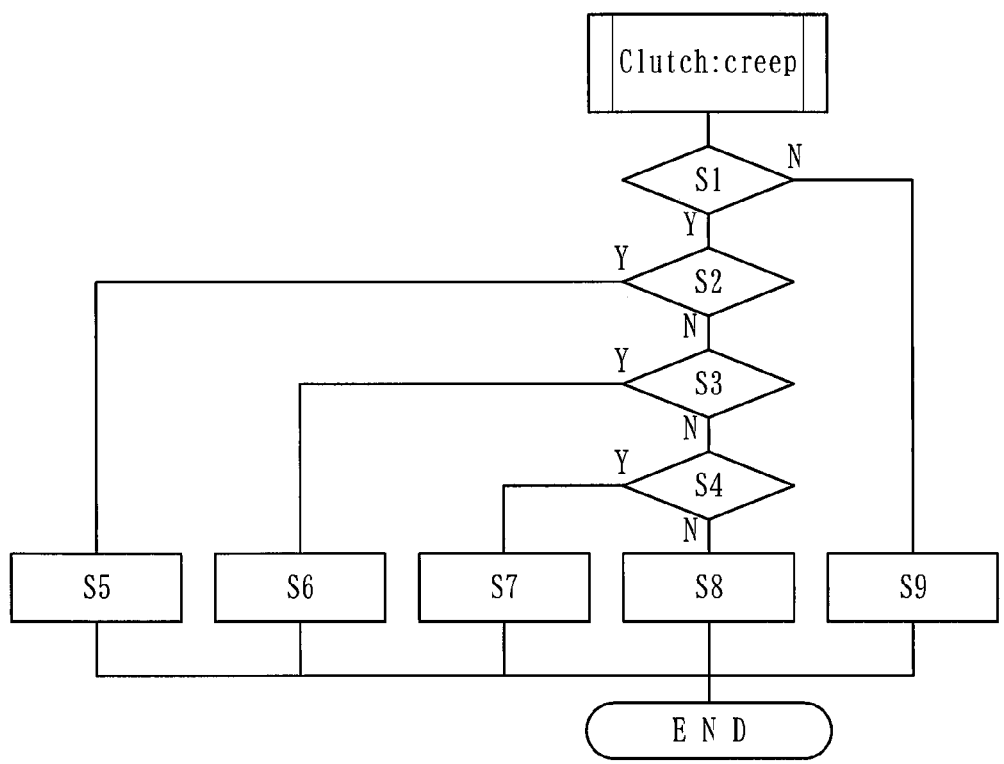

[Fig 28]
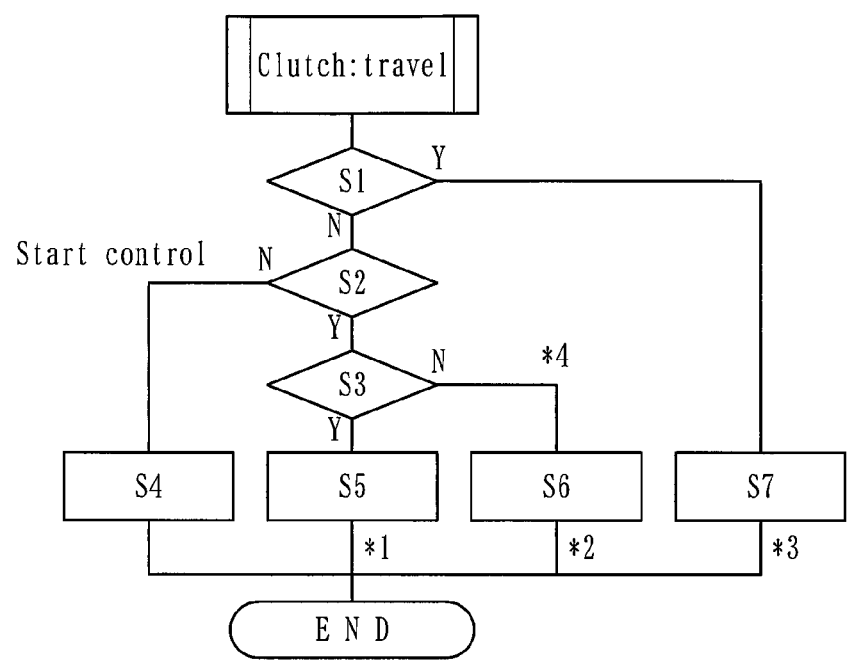

[Fig 29]
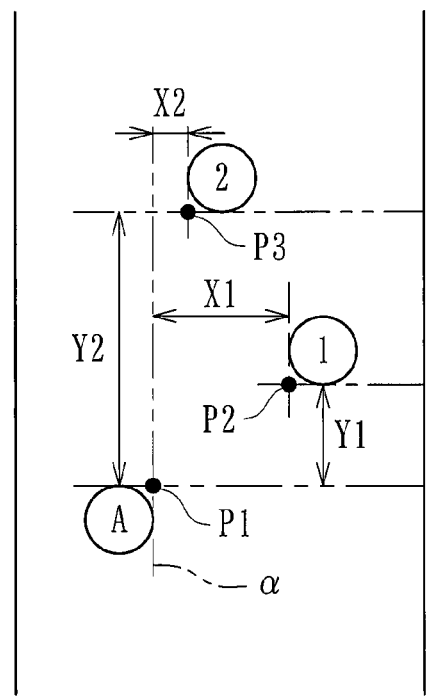
[Fig 30]
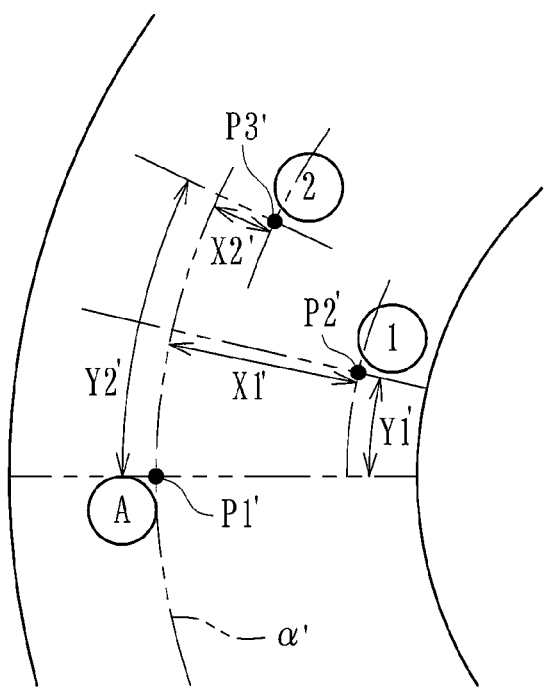

[ Fig 31 ]
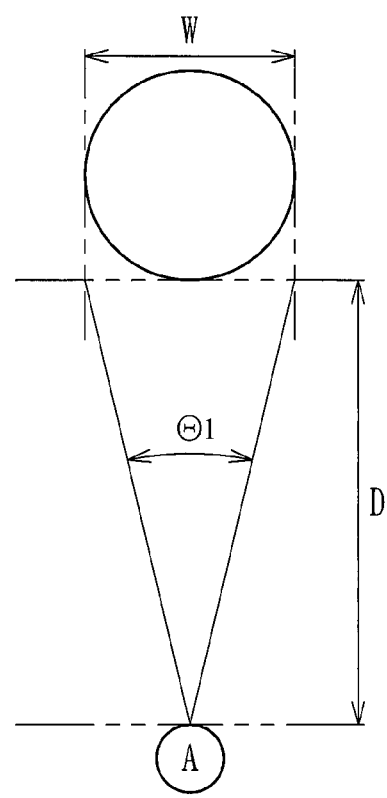

[Fig 32]
(a)
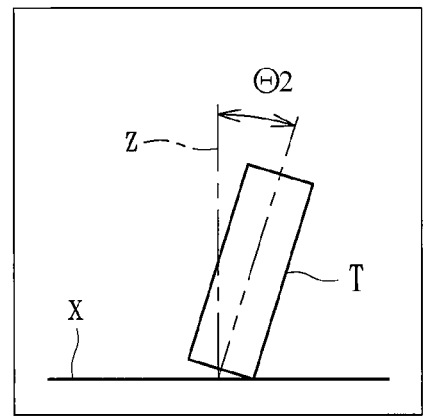
(b)
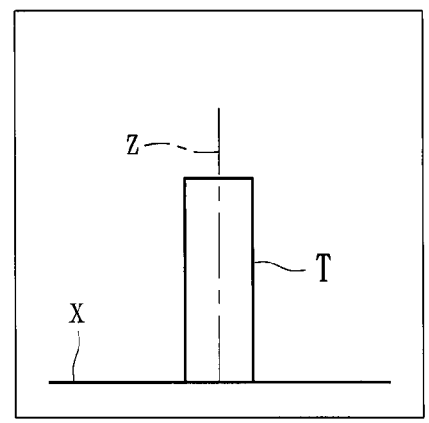
(c)
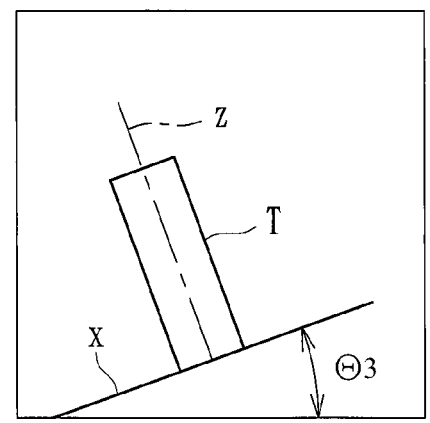

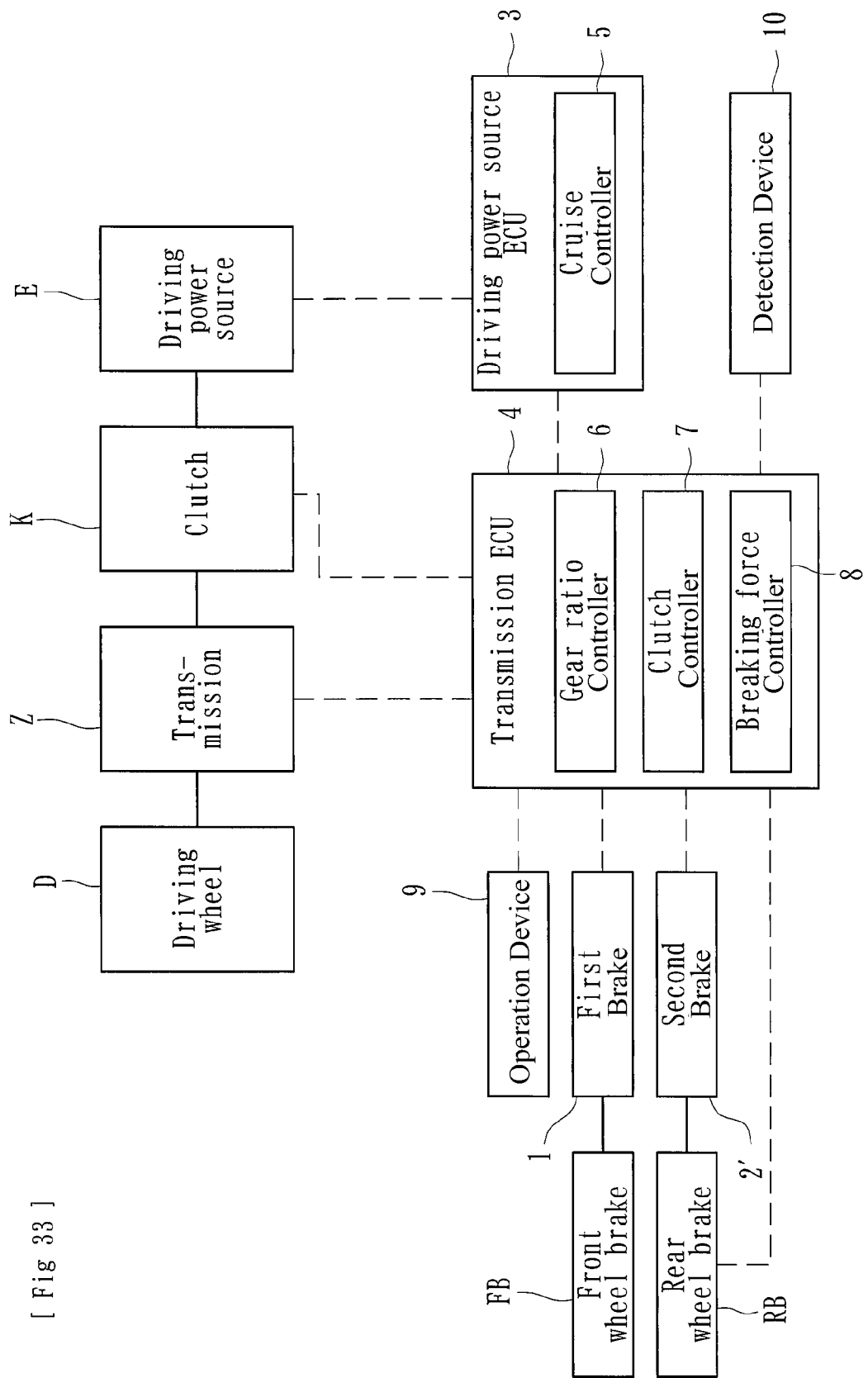
[ Fig 33 ]

[Fig 34]
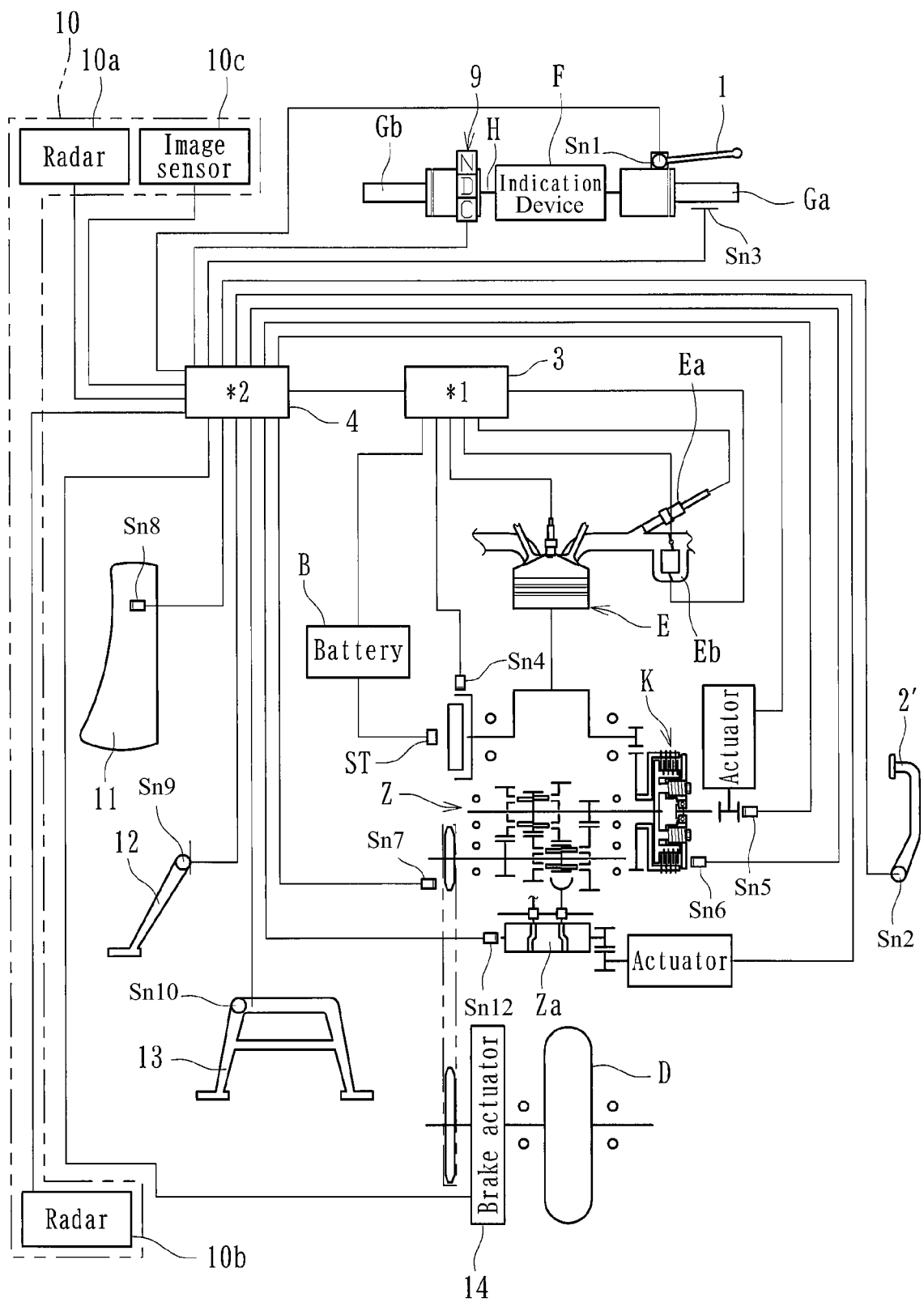

SADDLED VEHICLE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Technical Field

The present inventions relate to a saddled vehicle driven by a driver sitting on a saddle seat of the vehicle with steering a handlebar.

Description of the Related Art

It can be troublesome to operate an accelerator and brake to keep an intervehicular distance constant when vehicles such as automobiles travel. Accordingly, various vehicles have been proposed which can achieve the cruise control to automatically keep the intervehicular distance constant (see, e.g., Japanese Patent References JP H10-338055 A and JP 2006-88771 A). The cruise control of the prior art has been configured to control the driving power so that an own vehicle (e.g., a vehicle driven by the driver and having the cruise control equipment and functionality) can follow a preceding vehicle while keeping a preset intervehicular distance relative to the preceding vehicle.

SUMMARY

However, in the prior art above, it is supposed that the own vehicle is an automobile other than a saddled vehicle steered by a handlebar and thus there are differences in cruise control between them. That is, since the saddled vehicle such as a motorcycle has a vehicle width smaller than an automobile and is able to easily and quickly perform course change by inclining a body of the motorcycle by shifting driver's weight, it is excellent in performance for avoiding approach of an own vehicle to other vehicles and thus it is preferable to perform a cruise control superior in the basic characteristics and the vehicle approach avoiding performance of motorcycles. In addition, when a motorcycle group of friends travels in a same traffic lane, it is can be desirable to perform a cruise control suitable for travelling in two alternate rows of two longitudinal rows that can be shifted back and forth so that each vehicle does not have another vehicle on the side of the own vehicle (e.g., a staggered arrangement) in order to reduce the total length of the vehicle row of the group.

It is therefore an object of the present disclosure to provide a saddled vehicle which can perform the cruise control utilizing the basic characteristics and the vehicle approach avoiding performance of the saddled vehicle steered by a handlebar (e.g., a motorcycle).

According to some embodiments, there is provided a saddled vehicle driven by a driver sitting on a saddle seat with steering a handlebar comprising a detection means for detecting a traffic lane in which an own vehicle (e.g., the vehicle drive by the driver) travels and other vehicles; and a cruise control means for judging the other vehicles detected by the detection means and traveling in a same traffic lane as the own vehicle's traffic lane as a preceding vehicle and for cruise controlling the own vehicle so that it follows the preceding vehicle while keeping a preset intervehicular distance relative to the preceding vehicle characterized in that the cruise control means determines a forward intervehicular distance which is a distance from the own vehicle to the preceding vehicle in a traveling direction and a side intervehicular distance which is a distance from the own vehicle to the preceding vehicle in a vehicle width direction and performs the cruise control (e.g., automatic travel control) in accordance with the forward intervehicular distance and the side intervehicular distance.

According to some embodiments, the cruise control means controls the own vehicle so that it has a small forward intervehicular distance when cruise controlling relative to the preceding vehicle having a side intervehicular distance larger than a predetermined value as compared with a preceding vehicle having a side intervehicular distance smaller than the predetermined value According to some embodiments, the cruise control means controls the own vehicle so that it has a forward intervehicular distance larger than zero (0) when cruise controlling relative to the preceding vehicle having the side intervehicular distance larger than a predetermined value.

According to some embodiments, the cruise control means controls vehicle operation so that the forward intervehicular distance of the own vehicle is allowed to become zero (0) with respect to a preceding vehicle when the vehicle speed of the own vehicle is lower than a predetermined value and the preceding vehicle has a side intervehicular distance larger than a predetermined value.

According to some embodiments, the detection means is configured to detect the width of the preceding vehicle and the cruise control means sets the forward intervehicular distance so that the forward intervehicular distance of the preceding vehicle having a larger vehicle width detected by the detection means is larger than that of the preceding vehicle having a smaller vehicle width detected by the detection means.

According to some embodiments, the detection means is able to detect the inclination angle of the preceding vehicle and the cruise control means sets the forward intervehicular distance so that the forward intervehicular distance of the preceding vehicle having a larger inclination angle detected by the detection means is larger than that of the preceding vehicle having a smaller inclination angle detected by the detection means.

According to some embodiments, the cruise control means is able to judge whether the cruise control is stably performed for a predetermined period of time and to change the forward intervehicular distance and set a smaller forward intervehicular distance when the cruise control is stably performed for a predetermined period of time.

According to some embodiments, the saddled vehicle (e.g., the vehicle driven by the driver) is able to warn the driver when the forward intervehicular distance becomes smaller than a predetermined value relative to the preceding vehicle having a side intervehicular distance smaller than a predetermined value.

According to some embodiments, the warning is performed by weakly operating the brake of the vehicle.

According to some embodiments, the detection means is configured to detect the inclination angle of the own vehicle and to judge that the vehicle approach avoiding operation by the own vehicle (e.g., operation of the own vehicle to avoid collision and/or undesired proximity to another vehicle) has been performed when the inclination angle of the own vehicle detected by the detection means was increased larger than a predetermined value after the warning.

According to some embodiments, the warning is completed subject to judgment that the vehicle approach avoiding operation by the own vehicle has been performed.

According to some embodiments, only a rear wheel brake is operated when the forward intervehicular distance has become smaller than a predetermined value relative to the preceding vehicle having a side intervehicular distance smaller than a predetermined value.

According to some embodiments, the detection means is configured to determine that the traffic lane of the traveling direction is curved based on detection by the detection means and the cruise control means sets the forward intervehicular distance larger in a curved traffic lane than a straight traffic lane subject to the determination that the traffic lane of the traveling direction is curved.

According to some embodiments, the cruise control means is configured to judge a plurality of vehicles traveling in the same traffic lane as preceding vehicles and to control the own vehicle relative to the preceding vehicles in accordance with respective forward intervehicular distances and side intervehicular distances relative to them.

According to some embodiments, a creep control is performed by controlling a clutch under conditions of no accelerator operation and idling of a driving power source when a speed of the own vehicle is lower than a predetermined value.

In some embodiments in which the cruise control means obtains a forward intervehicular distance which is a distance relative to the preceding vehicle in a traveling direction and a side intervehicular distance which is a distance relative to the preceding vehicle in a vehicle width direction and performs the cruise control in accordance with the forward intervehicular distance and the side intervehicular distance, it is possible to perform the cruise control utilizing the basic characteristics and the vehicle approach avoiding performance of the saddled vehicle steered by a handlebar (e.g., a motorcycle).

In some embodiments in which the cruise control means controls the own vehicle so that it has a small forward intervehicular distance when cruise controlling relative to the preceding vehicle having the side intervehicular distance larger than a predetermined value as compared with the preceding vehicle having the side intervehicular distance smaller than the predetermined value, it is possible to perform the cruise control utilizing the basic characteristics and the vehicle approach avoiding performance of the saddled vehicle steered by a handlebar such as a motorcycle.

In some embodiments in which the cruise control means controls the own vehicle so that it has a forward intervehicular distance larger than zero (0) when cruise controlling relative to the preceding vehicle having A side intervehicular distance larger than a predetermined value, it is possible to avoid parallel traveling of vehicles and enables to keep a side space for avoiding the parallel traveling of the own vehicle.

In some embodiments in which the cruise control means controls so that the forward intervehicular distance of the own vehicle is allowed to become zero (0) when the vehicle speed of the own vehicle is lower than a predetermined value when performing the cruise control relative to the preceding vehicle having the side intervehicular distance larger than a predetermined value, it is possible to allow the own vehicle to perform parallel traveling at the time of reduced speed traveling and stop in s parallel-positioned state during a traffic signal stop and to give priority to shortening the row of vehicles over keeping the space for the side intervehicular distance of the own vehicle when travelling through a traffic jam at reduced speed or stopping at traffic signal.

In some embodiments in which the detection means is able to detect the width of the preceding vehicle and the cruise control means sets the forward intervehicular distance so that the forward intervehicular distance of the preceding vehicle having a larger vehicle width detected by the detection means is larger than that of the preceding vehicle having a smaller vehicle width detected by the detection means, it is possible to surely perform the vehicle approach avoidance (e.g., the maneuvers and/or operations of the own vehicle used to avoid collision with another vehicle) of the own vehicle by increasing the forward intervehicular distance relative to a wide and difficult-to-avoid preceding vehicle by changing the traveling course.

In some embodiments in which the detection means is able to detect the inclination angle of the preceding vehicle and the cruise control means sets the forward intervehicular distance so that the forward intervehicular distance of the preceding vehicle having a larger inclination angle detected by the detection means is larger than that of the preceding vehicle having a smaller inclination angle detected by the detection means, it is possible to easily perform the vehicle approach avoidance of the own vehicle relative to the traveling course change of the preceding vehicle by increasing the forward intervehicular distance when the preceding vehicle inclines its vehicle body in order to travel on the curved lane.

In some embodiments in which the cruise control means is able to judge whether the cruise control is stably performed for a predetermined period of time and to change the forward intervehicular distance and set a smaller forward intervehicular distance subject to that the cruise control is stably performed for a predetermined period of time, it is possible to reduce the forward intervehicular distance when a stable cruise control is performed, for example, during long term travel in a straight traffic lane.

In some embodiments in which the own vehicle is able to warn a driver when the forward intervehicular distance becomes smaller than a predetermined value relative to the preceding vehicle having a side intervehicular distance smaller than a predetermined value, it is possible to allow a driver to select either method of changing the traveling direction or reducing the vehicle speed for avoiding the vehicle approach.

In some embodiments in which the warning is performed by weakly operating the brake of the vehicle, it is possible to eliminate any display or sound for warning and thus more surely warn the driver.

In some embodiments in which the detection means is able to detect the inclination angle of the own vehicle and to judge that the vehicle approach avoiding operation by the own vehicle has been performed when the inclination angle of the own vehicle detected by the detection means was increased larger than a predetermined value after the warning, it is possible to determine that the vehicle approach avoiding operation has been performed in response to the warning.

In some embodiments in which the warning is completed subject to judgment that the vehicle approach avoiding operation by the own vehicle has been performed, it is possible to automatically stop the warning.

In some embodiments in which only a rear wheel brake is operated when the forward intervehicular distance has become smaller than a predetermined value relative to a preceding vehicle having the side intervehicular distance smaller than a predetermined value, more gentle braking force can be obtained than a case in which a front wheel brake is operated and thus it is possible to increase the forward intervehicular distance by the warning to a driver and reducing the vehicle speed while suppressing unstable operation of the own vehicle.

In some embodiments in which the detection means is configured to determine that the traffic lane of the traveling direction is curved based on detection by the detection means and the cruise control means sets the forward intervehicular distance larger in a curved traffic lane than a straight traffic lane when the detection means identifies the curved lane of the traveling direction, it is possible to more surely perform the vehicle approach avoidance without course change in the curved lane and reduce the vehicle speed prior to the curved lane traveling.

In some embodiments in which the cruise control means judges a plurality of vehicles traveling in the same traffic lane as preceding vehicles and controls the own vehicle relative to the preceding vehicles in accordance with respective forward intervehicular distances and side intervehicular distances relative to them, it is possible to shorten a row of vehicles when a plurality of vehicles travel in a same traffic lane by traveling in two alternate rows of two longitudinal rows as compared with a single longitudinal row travel in a same traffic lane.

In some embodiments in which a creep control is performed by controlling a clutch under conditions of no accelerator operation and idling of an driving power source when a speed of the own vehicle is lower than a predetermined value, it is possible to finely control the vehicle speed by braking and accordingly easily control the intervehicular distance without performing the accelerator operation during traffic jam of vehicles under the cruise control.

BRIEF DESCRIPTION OF THE DRAWINGS

FIG. 1 is a block diagram showing a concept of the saddled vehicle according to a first embodiment of the present inventions;

FIG. 2 is a schematic view showing a general structure of the saddled vehicle of FIG. 1;

FIG. 3 is a map used in the cruise control of the cruise control means of the saddled vehicle;

FIG. 4 is a time chart showing the traveling state (adjustment of intervehicular distance) during the cruise control of the saddled vehicle;

FIG. 5 is a time chart showing the traveling state (warning and braking) during the cruise control of the saddled vehicle;

FIG. 6 is a flowchart showing controls in range selections of the saddled vehicle;

FIG. 7 is a flowchart showing the cruise control of the saddled vehicle;

FIG. 8 is a flowchart showing detections by images and radars of the saddled vehicle;

FIG. 9 is a flowchart showing a control for determining that the cruise control of the saddled vehicle is being stably performed;

FIG. 10 is a flowchart showing a driving power (vehicle speed) control of the saddled vehicle;

FIG. 11 is a graph showing a relation between the throttle opening of the early period of the cruise control and the vehicle speed of the saddled vehicle;

FIG. 12 is a graph for judging suitability of the present vehicle speed relative to the setting vehicle speed of the saddled vehicle;

FIG. 13 is a graph showing a relation between the throttle opening and the operation degree of the throttle grip (accelerator opening);

FIG. 14 is a flowchart showing the gear ratio (vehicle speed) control of the saddled vehicle;

FIG. 15 is a graph showing the gear ratio map of the saddled vehicle;

FIG. 16 is a flowchart showing the judgment of the intervehicular distance of the saddled vehicle;

FIG. 17 is a graph showing a relation between the vehicle speed and the intervehicular distance (correction value of intervehicular distance);

FIG. 18 is a flowchart showing the driving power control (following) of the saddled vehicle;

FIG. 19 is a map for the driving power control of the saddled vehicle;

FIG. 20 is a flowchart showing the gear ratio control (following) of the saddled vehicle;

FIG. 21 is a map for the gear ratio control of the saddled vehicle;

FIG. 22 is a flowchart showing the braking force control (following) of the saddled vehicle;

FIG. 23 is a map for the braking force control of the saddled vehicle;

FIG. 24 is a graph showing the brake actuator braking force performed in the braking force control of the saddled vehicle;

FIG. 25 is a flowchart showing the clutch control of the saddled vehicle;

FIG. 26 is a graph showing the characteristics of the clutch torque capacity;

FIG. 27 is a flowchart showing the clutch control during creep of the saddled vehicle;

FIG. 28 is a flowchart showing the clutch control during travel of the saddled vehicle;

FIG. 29 is an explanatory drawing showing a method of judgment of the preceding vehicle (straight lane);

FIG. 30 is an explanatory drawing showing a method of judgment of the preceding vehicle (curved lane);

FIG. 31 is an explanatory drawing showing a method of judgment of the vehicle width of the preceding vehicle;

FIG. 32 is an explanatory drawing showing a method of judgment of the inclination angle of the preceding vehicle or the own vehicle;

FIG. 33 is a block diagram showing a concept of the saddled vehicle according to a second embodiment of the present inventions; and FIG. 34 is a schematic view showing a general structure of the saddled vehicle of FIG. 33.

DETAILED DESCRIPTION

Embodiments are described below in the context of saddled vehicles because the inventions disclosed herein have particular utility in that context. However, the inventions disclosed herein can be used in other contexts as well, including vehicles with more than two wheels, and other types of propulsion systems.

A saddled vehicle of the first embodiment of the present inventions is shown as a two-wheeled vehicle driven by a driver sitting on a saddle seat and steering a handlebar. The vehicle comprises, as shown FIGS. 1 and 2, a driving power source (an engine in the present embodiments) E, a handlebar H, a transmission Y (a continuously variable transmission (CVT) in the first embodiment), a clutch K, two operation means for braking the vehicle comprising a first brake 1 (which can serve as a first brake means) and a second brake 2 (which can serve as a second brake means), a driving power source ECU (engine ECU) 3 comprising a cruise controller 5 (which can serve as a cruise control means), and a transmission ECU 4 comprising a gear ratio controller 6 (which can serve as a gear ratio control means), a clutch controller 7 (which can serve as a clutch control means) and a braking force controller 8 (which can serve as a braking force control means). A reference character "ST" in FIG. 2 denotes a starter for starting the driving power source E.

The handlebar H can be used for steering the vehicle. On both tip ends of the handlebar H are respectively mounted a grasping grip Gb grasped by a driver's left hand and a throttle grip Ga for accelerator operation, which can be grasped and rotated by a driver's right hand. An operation device 9 (which can serve as an operation means) for selecting a desired traveling mode of the vehicle can be mounted on the tip end of the handlebar H where the grasping grip Gb is mounted (base end side of the grasping grip Gb). The operation means 9 can be configured to be switch between a neutral range (N range), a drive range (D range) and a cruise control range (C range), for example, by operating the operation means 9 with a driver's hand grasping the grasping grip Gb.

This embodiment can be configured so that the cruise control range (C range) and the drive range (D range) can be selected by the operation means 9 as a travel range and the cruise control can be performed by a cruise control means 5 later described when C range is selected and the cruise control by the cruise control means 5 can be released when D range is selected. This configuration can enable elimination of a separate switch for releasing the cruise control. The selected range (N range, D range or C range) can be indicated by an indication device F, which can be in the form of an electric display device arranged at a position visible by a driver, and which can serve as an indication means for indicating the operational state of the operation means 9.

The throttle grip Ga can be configured to perform the accelerator operation while being grasped by a driver and rotated a predetermined angle to supply a desired amount of fuel to cylinder(s) of the driving power source E by opening and closing a fuel injection valve Ea and throttle opening adjust valve Eb of the driving power source E in accordance with its rotated angle in order to drive the driving power source E at a desirable rotation or power output. A suitable switch case for operating various electronic parts of the vehicle can be mounted on the handlebar H at the base end of the throttle grip Ga.

The first brake means 1, which can serve as a first brake operation device, a first brake operation means, or first brake operation input member, can be mounted on the tip end of the handlebar H (base end of the throttle grip Ga). The first brake means 1 comprises a swingable lever configured to be operated by a hand of a driver grasping the throttle grip Ga and the vehicle is braked, for example, with a front wheel brake FB being operated when the swing motion is detected by a brake operation detection sensor Sn1.

The second brake means 2, which can serve as a second brake operation device, a second brake operation means, or second brake operation input member, is mounted on the tip end of the handlebar H (base end of the grasping grip Gb). Similarly to the first brake means 1, the second brake means 2 comprises a swingable lever operated by a hand of a driver grasping the grasping grip Gb and the vehicle is braked, for example, with a rear wheel brake RB being operated when the swing motion is detected by a brake operation detection sensor Sn2.

As described above, the first brake means 1 can brake the front wheel by operating the front wheel brake FB and the second brake means 2 can brake the rear wheel by operating the rear wheel brake RB in this embodiment. However, if the brake system comprises two operation devices for braking the front and rear wheels and the object for braking is different for each, it may be configured so that a first brake means 1 can brake the front wheel and a second brake means 2 can brake both the front and rear wheels by operating both the front and rear wheel brake FB, RB.

The saddled vehicle of the present embodiment comprises detection sensors Sn9 and Sn10 for detecting states (e.g., operated state or not-operated state) respectively of the side stand 12 and the main stand 13, a detection sensor Sn8 for detecting presence or absence of a seated driver on the saddle seat 11, a detection sensor Sn3 for detecting a rotational angle of the throttle grip Ga (i.e. accelerator opening), an engine rotation sensor Sn4 electrically connected to the driving power source ECU 3 and a vehicle speed sensor Sn7 for detecting the vehicle speed.

The transmission Y and the clutch K can be arranged in the middle of the power transmitting path from the driving power source E to the driving wheel D. The transmission Y of the present embodiment comprises a CVT automatically changeable to a gear ratio according to a range set by the operation means 9. The transmission Y can be controlled by a gear ratio control means 6 and is configured to transmit the driving power of the driving power source E to the driving wheel D when the operation means 9 is set to D range (drive range) and C range (cruise control range) as well as and is configured to not transmit the driving power of the driving power source E to the driving wheel D by cutting off power transmission when having the clutch K "OFF" at "N" range (neutral range).

The clutch K can be a multiple disc clutch in this embodiment arranged on the power transmitting path between the transmission Y and the driving wheel D and can be adapted to transmit and cut off the driving power of the driving power source E to the driving wheel D at any time during operation of the vehicle. The clutch K can be switched between an "ON" state in which the driving power of the driving power source E can be transmitted to the driving wheel D and an "OFF" state in which the driving power of the driving power source E cannot be transmitted to the driving wheel D.

The clutch K of the present embodiment can be provided with a clutch position angle sensor Sn5 and a clutch rotation sensor Sn6 and detected signals from these sensors Sn5, S6 can be transmitted to the transmission ECU 4. The press-contacted condition of clutch discs can be determined from the detected signals and thus the torque capacity (TC) of the clutch K can be determined.

The transmission ECU 4 can comprise a microcomputer etc. for controlling the transmission Y and the clutch K and can be electrically connected to the driving power source ECU 3 for transmitting and receiving electric signals therebetween as well as electrically connected to actuators etc. of the transmission Y and the clutch K. As shown in FIG. 1, the transmission ECU 4 can comprise the gear ratio control means 6, the clutch control means 7 for controlling the clutch K and the braking force control means 8 for controlling the braking force of the rear wheel brake RB by actuating the brake actuator 14 during operation of the vehicle.

The transmission ECU 4 can be connected to the detection means 10 for detecting a traffic lane in which the own vehicle travels and other vehicles. The detection means 10 can comprise a radar 10a for irradiating millimeter waves in a range, for example, of 120°, to objects forward of the own vehicles and for receiving the waves reflected from objects. The detection means 10 can comprise a radar 10b for irradiating millimeter waves to objects rearward of the own vehicles with swinging within a range, for example, of 120°, and for receiving the waves reflected from objects (e.g., to watch the right side of the own vehicle during left side traveling within the traffic lane and the left side of the own vehicle during right side traveling) in order to detect other vehicles. The detection means 10 can comprise an image sensor 10c for detecting the traffic lane and other vehicles by imaging a forward field of the own vehicle.

The driving power source ECU (engine ECU) 3 can comprise a microcomputer etc. for controlling the driving power source E and can be connected to the battery B mounted on the vehicle to be supplied with electric power and to transmit and receive electric signals while being electrically connected to the transmission ECU 4. The driving power source ECU 3 of the present embodiment can comprise the cruise control means 5.

The cruise control means 5 can be configured to identify as a preceding vehicle 1 and/or 2 (FIG. 29) the other vehicles detected by the detection means 10 and traveling in a same traffic lane as the own vehicle's traffic lane. The cruise control means 5 can be configured to cruise control (e.g., control the speed of) the own vehicle A so that it follows the preceding vehicle 1 and/or 2 while keeping a preset intervehicular distance relative to the preceding vehicle 1 and/or 2. Specifically, the cruise control means 5 is configured to automatically operate the own vehicle A so that the own vehicle A follows the preceding vehicle 1 and/or 2 by controlling the own vehicle A at control values so as to keep, between the own vehicle A and the preceding vehicle(s), a preset forward intervehicular distances Y1, Y2 and a preset side intervehicular distances X1, X2 respectively.

The cruise control means 5 of the present embodiment can determine a forward intervehicular distance Y which is a distance relative to the preceding vehicle in a traveling direction and a side intervehicular distance X which is a distance relative to the preceding vehicle in a vehicle width direction (direction substantially orthogonal to the traveling direction) based on information detected by detection means 10. The cruise control means 5 can perform the cruise control in accordance with the forward intervehicular distance Y and the side intervehicular distance X, judge a plurality of vehicles traveling in a same traffic lane as preceding vehicles, and perform the cruise control in accordance with the forward intervehicular distance Y and the side intervehicular distance X relative to the preceding vehicles respectively.

For example, when a traffic lane detected by the detection means 10 is determined to be a straight traveling road (straight lane) and supposing that preceding vehicle 1 and/or 2 travel in a same traffic lane as shown in FIG. 29, a point (reference point P1) of the own vehicle A nearest to the preceding vehicle 1 and/or 2, a point (nearest point P2) of the preceding vehicle 1 nearest to the own vehicle A, a point (nearest point P3) of the preceding vehicle 2 nearest to the own vehicle A, and a virtual line α (straight line in this case) passing through the reference point P1 and parallel to the traffic lane are each determined. In this case it is defined that an intervehicular distance in the traveling direction from the reference point P1 to the nearest point P2 is a forward intervehicular distance Y1 relative to the preceding vehicle 1, a side intervehicular distance (shortest distance from the nearest point P2 to the virtual line α) in the vehicle width direction from the reference point P1 to the nearest point P2 is a side intervehicular distance X1 relative to the preceding vehicle 1, an intervehicular distance in the traveling direction from the reference point P1 to the nearest point P3 is a forward intervehicular distance Y2 relative to the preceding vehicle 2, and a side intervehicular distance (shortest distance from the nearest point P3 to the virtual line α) in the vehicle width direction from the reference point P1 to the nearest point P3 is a side intervehicular distance X2 relative to the preceding vehicle 2.

Furthermore, for example, when a traffic lane detected by the detection means 10 is determined to be a curved traveling road (curved lane) and supposing that preceding vehicle 1 and/or 2 travel in a same traffic lane as shown in FIG. 30, a point (reference point P1') of the own vehicle A nearest to the preceding vehicle 2, a point (nearest point P2') of the preceding vehicle 1 nearest to the own vehicle A, a point (nearest point P3') of the preceding vehicle 2 nearest to the own vehicle A, and a virtual line α' (curved line in this case) passing through the reference point P1' and parallel to the traffic lane are each determined. In this case it is defined that an intervehicular distance in the traveling direction from the reference point P1' to the nearest point P2' is a forward intervehicular distance Y1' relative to the preceding vehicle 1, a side intervehicular distance (shortest distance from the nearest point P2' to the virtual line α') in the vehicle width direction from the reference point P1' to the nearest point P2' is a side intervehicular distance X1' relative to the preceding vehicle 1, an intervehicular distance in the traveling direction from the reference point P1' to the nearest point P3' is a forward intervehicular distance Y2' relative to the preceding vehicle 2, and a side intervehicular distance (shortest distance from the nearest point P3' to the virtual line α') in the vehicle width direction from the reference point P1' to the nearest point P3' is a side intervehicular distance X2' relative to the preceding vehicle 2.

According to the present embodiment, a map shown in FIG. 3 is used which enables to select an optimal intervehicular distance mode from a relation between the forward intervehicular distance Y and the side intervehicular distance X. This map indicates on one axis (abscissa) the forward intervehicular distance Y ("intervehicular distance 1~4+correction" in the present embodiment) and on the other axis (ordinate) the side intervehicular distance X. The side intervehicular distance X is divided into a near-side map (left side of a predetermined value Xa of intervehicular distance) and a far-side map (right side of the predetermined value Xa) along the predetermined value Xa. A relationship between the "intervehicular distance 1~4" and the "intervehicular distance 1~4+correction" is shown in FIG. 17 (FIG. 17 shows as one example a relation between the intervehicular distance 3 and the intervehicular distance 3+correction).

Braking by the brakes etc. (described later) is performed when an intervehicular mode 1 is selected from a relation between the forward intervehicular distance Y and the side intervehicular distance X, a warning (described later) is performed when an intervehicular mode 2 is selected, a speed adjustment is performed so that the forward intervehicular distance Y between the preceding vehicle and the own vehicle is kept constant when intervehicular modes 3 or 5 are selected, and the speed adjustment is not performed when an intervehicular mode 4 is selected. Accordingly, a control shown in FIG. 4 is performed when the intervehicular modes 3~5 are selected, and a control shown in FIG. 5 is performed especially when the intervehicular modes 1, 2 are selected.

The cruise control means 5 of the present embodiment controls the own vehicle A so that it has a small forward intervehicular distance Y when cruise controlling relative to the preceding vehicle 1 and/or 2 having a side intervehicular distance X larger than a predetermined value as compared with the preceding vehicle 1 and/or 2 having a side intervehicular distance X smaller than the predetermined value. That is, since vehicle approach can be easily avoided even if the preceding vehicle would reduce its speed when the side intervehicular distance X relative to the preceding vehicle is large, the cruise control means 5 operates the own vehicle such that the forward intervehicular distance Y will be small. On the contrary, since vehicle approach cannot be easily avoided if the preceding vehicle would reduce its speed when the side intervehicular distance X relative to the preceding vehicle is small, the cruise control means 5 operates the own vehicle so that the forward intervehicular distance Y will be large when the side intervehicular distance X relative to the preceding vehicle is small. This makes it possible to perform the cruise control utilizing the basic characteristics and the vehicle approach avoiding performance of the saddled vehicle steered by a handlebar such as a motorcycle.

In addition, the cruise control means 5 of the present embodiment is configured to control the own vehicle A so that it has a forward intervehicular distance Y larger than zero (0) when cruise controlling relative to the preceding vehicle 1 and/or 2 having the side intervehicular distance X larger than a predetermined value. This makes it possible to avoid parallel traveling of vehicles and enables maintenance of a side space for avoiding the parallel traveling of the own vehicle. That is, despite a risk that the own vehicle would approach the preceding vehicle when the own vehicle moves laterally to change its traveling direction if the own vehicle and the preceding vehicle travel in parallel, the cruise control means 5 can surely and smoothly perform the vehicle approach avoidance by preventing the parallel travel.

On the other hand, the cruise control means 5 of the present embodiment is configured to control the travel of the own vehicle so that the forward intervehicular distance Y of the own vehicle A is allowed to become zero (0) when the vehicle speed of the own vehicle A is lower than a predetermined value when controlling vehicle speed relative to a preceding vehicle 1 and/or 2 having a side intervehicular distance X larger than a predetermined value. That is, parallel traveling of the own vehicle A and such a preceding vehicle 1 and/or 2 is allowed. This makes it possible to allow the own vehicle to perform parallel traveling at the time of reduced speed traveling and stop in the parallel-positioned state during traffic signal stop by giving priority to shortening the row of vehicles over keeping the space for the side intervehicular distance of the own vehicle when travelling through a traffic jam at reduced speed or stopping at traffic signal.

In addition, the detection means 10 (e.g., radar 10a and image sensor 10c) of the present embodiment is able to detect the width W of the preceding vehicle 1 and/or 2 and the cruise control means 5 is configured to set the forward intervehicular distance Y so that the forward intervehicular distance Y of the preceding vehicle 1 and/or 2 having a larger vehicle width W detected by the detection means 10 is larger than that of the preceding vehicle 1 and/or 2 having a smaller vehicle width W detected by the detection means 10. For example as shown in FIG. 31, a distance D from the own vehicle A to the preceding vehicle can be detected by irradiating millimeter wave forward from the own vehicle A using the radar 10a. Thus the vehicle width W of the preceding vehicle can be detected by performing an operation such as $W=2\times D\times \tan(\Theta 1/2)$, wherein $\Theta 1$ can be calculated from imaging data of the image sensor 10c. Since it is judged that avoidance of vehicle approach is more difficult when the width W of the target preceding vehicle is large and on the contrary avoidance of vehicle approach is easier when the width W of the target preceding vehicle is small, the avoidance of vehicle approach (e.g., the maneuvers needed to avoid collision with the preceding vehicle) can be surely performed by increasing the forward intervehicular distance Y for the preceding vehicle having a large width W and being difficult to avoid approach.

Furthermore, the detection means 10 (more particularly image sensor 10c) of the present embodiment is able to detect the inclination angle $\Theta 2$ of the preceding vehicle 1 and/or 2 and the cruise control means 5 is configured to set the forward intervehicular distance Y so that the forward intervehicular distance Y of the preceding vehicle 1 and/or 2 having a larger inclination angle $\Theta 2$ detected by the detection means 10 is larger than that of the preceding vehicle 1 and/or 2 having a smaller inclination angle $\Theta 2$ detected by the detection means 10. For example as shown in FIG. 32(b), when the image sensor 10c images a rear tire T of the preceding vehicle, a center line of the tire T will usually corresponds to a vertical line "z" if the preceding vehicle is not inclined (wherein the vertical line "z" is substantially vertical to a horizontal line "x" of a road). However, if the preceding vehicle is inclined by an angle $\Theta 2$ as shown in FIG. 32(a), the tire T will be also inclined by the angle $\Theta 2$ relative to the vertical line "z" which can be detected by the image sensor 10c. This enables the own vehicle to easily avoid vehicle approach when the preceding vehicle changes a traveling course in a curved lane by increasing the forward intervehicular distance Y due to detection of the inclination of tire of the preceding vehicle.

Furthermore, the cruise control means 5 of the present embodiment can be configured to judge whether the cruise control is stably performed for a predetermined period of time and to change the forward intervehicular distance Y and set a smaller forward intervehicular distance Y when the cruise control is stably performed. This can facilitate reduction of the forward intervehicular distance Y when a stable cruise control is performed, for example, during long term travel in a straight traffic lane.

According to the present embodiment, the saddled vehicle can be configured to warn a driver that avoidance is necessary due to reduction of the forward intervehicular distance Y when the forward intervehicular distance Y becomes smaller than a predetermined value relative to the preceding vehicle 1 and/or 2 having the side intervehicular distance X smaller than a predetermined value. This makes it possible to allow a driver to change the traveling direction, or reduce the vehicle speed, or both to avoid approaching the preceding vehicle. The warning can be performed by weakly operating the brake of the vehicle. This makes it possible to reduce or eliminate any display or effective sound for warning and thus more surely warn the driver.

The detection means 10 (more particularly image sensor 10c) can be configured so that it is able to detect the inclination angle $\Theta 3$ of the own vehicle A and to judge that the vehicle approach avoiding operation by the own vehicle A has been performed when the inclination angle $\Theta 3$ of the own vehicle detected by the detection means 10 was increased larger than a predetermined value after the warning. For example as shown in FIG. 32(b), when the image sensor 10c images a forward view, the horizontal line "x"

positions in parallel to the horizontal image frame when the own vehicle is not inclined. On the other hand, if the own vehicle A is inclined by an angle Θ3 as shown in FIG. 32(c), the horizontal line "x" will be also inclined by the angle Θ3 relative to the horizontal image frame. Accordingly, the inclination of the own vehicle can be detected by the image sensor 10c and thus it is possible to surely grasp that the vehicle approach avoiding operation by inclination of the own vehicle has been performed in response to the warning.

Further, according to the present embodiment, the warning can be completed subject to judgment that the vehicle approach avoiding operation by the own vehicle A has been performed as described above. This makes it possible to automatically stop the warning. In addition, according to the present embodiment, only a rear wheel brake RB is operated subject to that the forward intervehicular distance Y has become smaller than a predetermined value relative to the preceding vehicle 1 and/or 2 having the side intervehicular distance X smaller than a predetermined value. Accordingly, more gentle braking force can be obtained than a case in which a front wheel brake FB is operated and thus it is possible to increase the forward intervehicular distance Y by the warning to a driver and to reduce the vehicle speed while suppressing unstable operation of the own vehicle.

Furthermore, the present embodiment is configured so that the detection means 10 (more particularly image sensor 10c) can be configured to determine that the traffic lane of the traveling direction is curved based on detection (e.g., detection of a road side strip or a center line) by the detection means 10 and the cruise control means 5 sets the forward intervehicular distance Y larger in a curved traffic lane than a straight traffic lane subject to the grasp of the curved lane of the traveling direction. This makes it possible to surely perform the vehicle approach avoidance without course change in the curved lane and reduce the vehicle speed prior to the reaching a curved lane.

In addition, in some embodiments where a creep control is performed by controlling a clutch K under conditions of no accelerator operation by the throttle grip Ga and idling of a driving power source E when a speed of the own vehicle is lower than a predetermined value, it is possible to finely control the vehicle speed by operating the front wheel brake FB or rear wheel brake RB and accordingly easily control the intervehicular distance Y without performing the accelerator operation during traffic jam of vehicles.

In some embodiments where the cruise control means 5 obtains the forward intervehicular distance Y which is a distance relative to the preceding vehicle 1 and/or 2 in a traveling direction and the side intervehicular distance X which is a distance relative to the preceding vehicle 1 and/or 2 in a vehicle width direction and performs the cruise control in accordance with the forward intervehicular distance Y and the side intervehicular distance X, it is possible to perform the cruise control utilizing the basic characteristics and the vehicle approach avoiding performance of the saddled vehicle steered by a handlebar H such as a motorcycle.

In some embodiments wherein the saddled vehicle judges a plurality of vehicles traveling in the same traffic lane as preceding vehicles 1 and/or 2 and controls the own vehicle A relative to the preceding vehicles 1 and/or 2 in accordance with respective forward intervehicular distances Y and side intervehicular distances X relative to them, it is possible to shorten a row of vehicles when a plurality of vehicles travel in a same traffic lane if traveling in two alternate rows of two longitudinal rows as compared with a single longitudinal row travel in a same traffic lane. Although, in some illustrations and descriptions of the present disclosure a plurality of vehicles traveling in a same traffic lane in two alternate rows are shown as the preceding vehicles, a single vehicle traveling in a same traffic lane may be target of the cruise control means of the present embodiment.

Then, the operation and release of the cruise control by the range selection in the saddled vehicle of the present embodiment will be described with reference to a flowchart of FIG. 6.

First of all, it is judged whether the operation means 9 is operated to select D range (drive range) (S1). When judged that the operation means 9 is operated to select D range, it goes to steps S12 and S13 and an indication of D range is indicated in the indication means F after the range of the vehicle has been set at D range. When judged that the operation means 9 is not operated to select D range at step S1, it goes to step S2 and is judged whether the operation means 9 is operated to select N range (neutral range).

When judged that the operation means 9 is operated to select N range, it goes to steps S10 and S11 and an indication of N range is indicated in the indication means F after the range of the vehicle has been set at N range. When judged that the operation means 9 is not operated to select N range at step S2, it goes to step S3 and is judged whether the vehicle is in N range. When judged the vehicle is in N range, it goes also in this case to steps S10 and S11 and an indication of N range is indicated in the indication means F after the range of the vehicle has been set at N range.

In addition, when judged that the vehicle is not in N range at S3, it goes to step S4 and is judged whether the vehicle speed is lower than a predetermined value *1 (cruise control upper limit vehicle speed). When judged the vehicle speed is lower than the predetermined value, it goes to step S5 and is judged whether the side stand 12 or the main stand 13 is in the operated position or whether a driver does not sit on the saddle seat 11 by detection sensors (detection sensors Sn8-Sn10). When not judged the side stand 12 or the main stand 13 is in the operated position or a driver does not sit on the saddle seat 11, it goes to step S6 and is judged whether the range of the vehicle is in C range (cruise control range).

When judged that the vehicle is not C range at S6, it goes to step S7 and is judged whether the operation means 9 is operated to select C range. When judged that the operation means 9 is operated to select C range, it goes to steps S8, S9 and an indication of C range is indicated in the indication means F after the range of the vehicle has been set at C range. On the other hand, when judged that the vehicle speed is not lower than the predetermined value *1 (cruise control upper limit vehicle speed) (step S4), it is detected by the detecting means (step S5) and that the operation means 9 is not operated to select C range (step S7), it goes to steps S12 and S13 and an indication of D range is indicated in the indication means F after the range of the vehicle has been set at D range.

When judged the vehicle is in C range at step S6, it goes to step S8 while skipping step S7. On the other hand, when the range of the vehicle has been set to N range at step 10 or when set to D range at step S12, the cruise control is released if under cruise control. Similarly, when the detection has been performed by the detection means at S5, the cruise control is released if under cruise control.

Then, the cruise control by the cruise control means 5 of the present embodiment will be described with reference to a flowchart of FIG. 7.

First of all, it is judged whether the vehicle is in C range (step S1). When it is in C range, the traffic lane in which the own vehicle travels and preceding vehicles etc. to be followed by the own vehicle are detected by the detection means 10 (image sensor 10c and radars 10a, 10b) at step S2. Then, it is judged whether any preceding vehicle is detected at step S3. When judged that the preceding vehicle is detected, the vehicle is identified as a first preceding vehicle (preceding vehicle 1) and its side intervehicular distance X1 and forward intervehicular distance Y1 are set (step S4).

Then, it is judged whether a second preceding vehicle (preceding vehicle 2) is detected at step S5. When judged that the preceding vehicle 2 is detected, it goes to step S6 and the second preceding vehicle's side intervehicular distance X2 and forward intervehicular distance Y2 are set. When the preceding vehicle 2 is not detected, it goes to step S7 and extremely large values (e.g. X2=20000, Y2=20000) are set as its side intervehicular distance X2 and forward intervehicular distance Y2 respectively. Then, the intervehicular distance judgement (step S8), driving power control (following) (step S9), gear ratio control (following) (S10) and braking force control (following) (S11) are sequentially performed based on the set side intervehicular distance (X1, X2) and forward intervehicular distance (Y1, Y2) and then it goes to step S22 to perform a feedback control (FB control) based on the Target ratio.

On the other hand, when judged that no preceding vehicle exists at step S3, it is judged at step S12 whether the first brake means 1 is under operation (ON). When judged it is "ON", it goes to step S15 and when judged it is not "ON", it goes to step S13 and is judged whether the accelerator is operated and it further goes to step S15 when judged the accelerator is operated. When judged the accelerator is not operated at step S13, it goes to step S14 and is judged whether the vehicle speed control is first time. When judged it is first time, it goes to step S15 and when judged that it is not first time, it goes to step S16 with skipping step S15.

When the vehicle speed is set to the setting vehicle speed at step S15, the driving power control (vehicle speed) (S16) and gear ratio control (vehicle speed) (S17) are sequentially performed and it goes to step S22 after setting the value of "BRAKE" to 0 (zero) (step S18) and performs the feedback control (FB control) based on the Target ratio. On the other hand, when judged that the own vehicle is not in C range at step S1, it goes to step S19 and set the throttle opening TH to "operation degree (AP) of throttle grip (Ga)+ idle TH (throttle)". Then, the Target ratio is set to a ratio based on the gear ratio map at step S20 to perform the feedback control (FB control) based on the Target ratio at step S22 while setting the value of "BRAKE" to 0 (zero) at step S21.

Then, the detection of the detection means 10 (e.g. image sensor 10c and radars 10a, 10b) will be described with reference to a flowchart of FIG. 8. In some embodiments, when two preceding vehicles exist, the forward intervehicular distance Y, side intervehicular distance X, vehicle width, and/or inclination of vehicle are calculated with respect to respective preceding vehicles.

First of all, the traffic lane is detected from an image of the image sensor 10c at step S1 and it is judged whether the detected traffic lane is a curved lane. Then, it goes to step S2 and judges a preceding vehicle traveling before the own vehicle in the same traffic lane as that of the own vehicle by the image sensor 10c and the radar 10a and then calculates the forward intervehicular distance Y and the side intervehicular distance X relative to the preceding vehicle at step S3.

Then, it is judged whether any curved lane exists within a predetermined distance at step S6 after detection of the vehicle width W of the preceding vehicle (S4) and detection of the inclination of the preceding vehicle (inclination angle $\Theta2$) (S5) have been sequentially performed. When judged that the curved lane is within a predetermined distance, the value of "correction" is set to "curved lane correction" at step S11. On the other hand, when judged that the curved lane is not within a predetermined distance, it is judged whether a maximum value of the vehicle width of two preceding vehicles is larger than the predetermined value at step S7. When judged the maximum value of the vehicle width of two preceding vehicles is larger than the predetermined value, the value of "correction" is set to "preceding vehicle correction" at step S12. On the contrary, when judged the maximum value of the vehicle width of two preceding vehicles is not larger than the predetermined value, it is judged whether a maximum value (inclination angle) of two preceding vehicles is larger than a predetermined value at step S8.

When judged that the maximum value of inclination of the preceding vehicle is larger than the predetermined value, the value of "correction" is set to the "preceding vehicle correction" at step S12. On the other hand, when judged that the maximum value of inclination of the preceding vehicle is not larger than the predetermined value, it is judged whether a period of time of stable state is shorter than the predetermined period of time at step S9. When judged that the period of time of the stable state is shorter than the predetermined period of time, the value of "correction" is set to the "preceding vehicle correction" at step S12 and when judged it is not shorter than the predetermined period of time, the value of "correction" is set to 0 (zero) at step S10.

The inclination (inclination angle) of the own vehicle is detected at step S13 after the value of "correction" having been set at steps S10, S11 and S12 and then it is judged whether the inclination angle of the own vehicle is greater than a predetermined value at step S14. When judged that the inclination angle of the own vehicle is larger than the predetermined value, the value of "own vehicle inclination" is set to 1 at step S15 and when judged that the inclination angle of the own vehicle is not larger than the predetermined value, the value of "own vehicle inclination" is set to 0 (zero) at step S16.

Then, the judgment of the stable state by the cruise control means 5 of the present embodiment will be described with respect to a flowchart of FIG. 9.

First of all, it is judged whether a predetermined period of time has elapsed from the detection of the preceding vehicle at step S1. When judged the predetermined period of time has elapsed, it is judged whether the number of the preceding vehicle is changed from the detection of the preceding vehicle at step S2. When the number of the preceding vehicle is not changed, it is judged whether a variation range of the vehicle speed (own vehicle speed) is lower than a predetermined value at step S3. When judged that the variation range of the vehicle speed is smaller than the predetermined value, it goes to step S4 to set a value of "stable state" to 1. On the other hand when the contents of S1 to S3 are different from judgments above, it goes to step S5 to set a value of "stable state" to 0 (zero) based on judgment of not stable state.

Then, the driving power control (vehicle speed control) by the cruise control means 5 of the present embodiment will be described with respect to a flowchart of FIG. 10.

First of all, it is judged whether the accelerator is operated at step S1. When judged that the accelerator is not operated, it goes to step S2 and is judged whether the first brake means 1 is operated and then goes to step S3 and is judged whether the second brake means 2 is operated. When judged that the accelerator is not operated at step S1, the first brake means 1 is not operated at step S2 and the second brake means 2 is not operated at step S3, it goes to step S4 and is judged whether the vehicle speed (own vehicle speed) is lower than a predetermined vehicle speed (upper limit speed of creep control). When judged the vehicle speed is lower than the predetermined vehicle speed, it goes to step S12 and when judged the vehicle speed is not lower than the predetermined vehicle speed, it goes to step S5 and is judged whether a predetermined time has elapsed from the cruise throttle (TH) output.

When judged that a predetermined time has not lapsed from the cruise throttle output at step S5, the throttle opening (TH) is set to the cruise throttle at step S9. The cruise throttle (cruise TH) is set as having a relation between the throttle opening and the vehicle speed shown in FIG. 11. When judgments different from those described above are done in step S1 to step S4, it goes to step S12 and sets the throttle opening (TH) to "operation degree of throttle grip Ga (AP)+ idle throttle (TH)". The relation between the operation degree (AP) of throttle grip Ga and the throttle opening is shown in FIG. 13.

On the other hand, when judged that a predetermined time has lapsed from the cruise throttle output at step S5, it is further judged whether the vehicle speed is higher than a setting vehicle speed at step S6. When judged the vehicle speed is higher than the setting vehicle speed, it goes to step S10 and sets the throttle opening to a value obtained by subtracting ΔTH from a present throttle opening (TH), wherein the lower limit of the throttle after subtracting ΔTH is idle throttle. On the other hand, when judged that the vehicle speed is not higher than the setting vehicle speed at step S6, it is judged at step S7 whether the vehicle speed is lower than a value obtained by subtracting Δvehicle speed from the setting vehicle speed. When judged that the vehicle speed is higher than said value, the throttle opening is set to the cruise throttle at step S9. A relation between the setting vehicle speed and the value obtained by subtracting Δvehicle speed from the setting vehicle speed is shown in FIG. 12.

Furthermore, when judged at step S7 that the vehicle speed is lower than said value, it is judged at step S8 whether the acceleration of the vehicle is lower than a predetermined value (upper limit of control acceleration at a time of cruise control). When judged at step S8 that the acceleration of the vehicle is lower than said predetermined value, it goes to step S11 and sets the throttle opening to a value obtained by adding ΔTH to the present throttle opening (TH). On the other hand, when judged at step S8 that the vehicle acceleration is not lower than the predetermined value, it is ended with skipping step S11.

Then, the gear ratio control (vehicle speed control) by the cruise control means 5 of the present embodiment will be described with respect to a flowchart of FIG. 14.

First of all, judgments whether the accelerator is operated (step S1), whether the first brake means 1 is operated (step S2), whether the second brake means 2 is operated (step S3), whether the throttle opening is smaller than a predetermined throttle opening (*1) (step S4) and whether the vehicle speed is higher than a setting vehicle speed (*2) (step S5) are performed. When the accelerator is operated, when the first or second brake means 1 or 2 is operated, the throttle opening is larger than the predetermined throttle opening and the vehicle speed is lower than the setting vehicle speed, all these cases go to step S8 and the Target ratio is set in accordance with a gear ratio map (*4) shown in FIG. 15.

On the other hand, when the accelerator is not operated, when the first and second brake means 1 and 2 are not operated, when the throttle opening is smaller than the predetermined throttle opening and when the vehicle speed is higher the setting vehicle speed, all these cases go to step S6 and it is judged whether the deceleration of the vehicle (own vehicle) is larger than 0 (zero) (e.g., whether the vehicle is decelerated). When judged that the deceleration of the vehicle is smaller than 0 (zero) (e.g., the vehicle is not decelerated) the Target ratio is set to a value obtained by adding Δratio to a present Target ratio (*3) at step S7. When judged that the deceleration of the vehicle is larger than 0 (zero) at step S6, it is ended with skipping step S7.

Then, the judgment of the intervehicular distance by the cruise control means 5 will be described with reference to a flowchart of FIG. 16 and a map of FIG. 3. In this case, when two preceding vehicles exist, the judgment of the intervehicular distance is performed on the basis of respective forward intervehicular distance Y and side intervehicular distance X.

First of all, it is judged whether the side intervehicular distance X relative to the preceding vehicle is smaller than an intervehicular distance Xa at step S1. When judged that the side intervehicular distance X relative to the preceding vehicle is smaller than an intervehicular distance Xa at step S1, it is judged whether the forward intervehicular distance Y is larger than "intervehicular distance 1+correction" at step S2 (a relation between the "intervehicular distance" and the "intervehicular distance+correction" is shown in FIG. 17). When judged at step S2 that the forward intervehicular distance Y is smaller than "intervehicular distance 1+correction", the intervehicular mode 1 is set at step S9. On the other hand, when judged the forward intervehicular distance Y is larger than "intervehicular distance 1+correction", it goes to step S3 and is judged whether the forward intervehicular distance Y is larger than "intervehicular distance 2+correction".

When judged at step S3 that the forward intervehicular distance Y is smaller than "intervehicular distance 2+correction", the intervehicular mode 2 is set at step S10. On the other hand, when judged the forward intervehicular distance Y is larger than "intervehicular distance 2+correction", it goes to step S4 and is judged whether the forward intervehicular distance Y is larger than "intervehicular distance 3+correction". When judged at step S4 that the forward intervehicular distance Y is smaller than "intervehicular distance 3+correction", the intervehicular mode 3 is set at step S11, on the other hand when judged the forward intervehicular distance Y is larger than "intervehicular distance 3+correction", it goes to step S5 and is judged whether the forward intervehicular distance Y is larger than "intervehicular distance 4+correction". When judged at step S5 that the forward intervehicular distance Y is smaller than "intervehicular distance 4+correction", the intervehicular mode 4 is set at step S12, on the other hand when judged the forward intervehicular distance Y is larger than "intervehicular distance 4+correction", the intervehicular mode 5 is set at step S13.

On the other hand, when judged at step S1 that the side intervehicular distance X relative to the preceding vehicle is not smaller than an intervehicular distance Xa, it goes to step S6 and is judged whether the vehicle speed (own vehicle speed) is lower than a predetermined vehicle speed (vehicle speed enabling parallel travel). When the vehicle speed (own vehicle speed) is not lower than the predetermined vehicle speed (vehicle speed enabling parallel travel), it goes to step S7 and is judged whether the forward intervehicular distance Y is larger than "intervehicular distance 13+correction". When judged at step S6 that vehicle speed (own vehicle speed) is lower than a predetermined vehicle speed (enabling parallel travel), it goes to step S8 with skipping step S7. When judged at step S7 that the forward intervehicular distance Y is larger than "intervehicular distance 13+correction", it goes to step S8 and is judged whether the forward intervehicular distance Y is larger than "intervehicular distance 14+correction". When judged that it is larger than "intervehicular distance 14+correction", the intervehicular mode 5 is set at step S13. When judged that it is not larger than "intervehicular distance 14+correction", the intervehicular mode 4 is set at step S14. When it is judged at step S7 that the forward intervehicular distance Y is not larger than "intervehicular distance 13+correction", it goes to step S15 and the intervehicular mode 3 is set.

Then, the driving power control (following) by the cruise control means 5 of the present embodiment will be described with respect to a flowchart of FIG. 18 and a map of FIG. 19.

First of all, judgments whether the accelerator is operated (step S1), whether the first brake (which can serve as a first brake means) is operated (step S2), whether the second brake (which can serve as a second brake means) is operated (step S3), whether the vehicle speed is lower than a predetermined vehicle speed (creep control upper limit vehicle speed) (step S4), whether the intervehicular mode relative to the first preceding vehicle is 1 or 2 (step S5) and whether the intervehicular mode relative to the second preceding vehicle is 1 or 2 (step S6) are performed. When the accelerator is operated, when the first or second brake means is operated, when the vehicle speed is lower than the predetermined vehicle speed, or when the intervehicular modes relative to the first and second preceding vehicles are 1 or 2, all these cases go to step S16 and the throttle opening (TH) is set to "operation degree of the throttle grip Ga (AP)+ idle throttle (TH)".

On the other hand, when the accelerator is not operated, when the first and second brake means 1 and 2 are not operated, when the vehicle speed is higher than the predetermined vehicle speed, and when the intervehicular modes relative to the first and second preceding vehicles are not 1, 2, it goes to step S7 and is judged whether a predetermined time has passed from the cruise throttle (TH) output. When judged at step S7 that the predetermined time has not passed from the cruise TH output, it goes to step S13 and sets the throttle opening (TH) to the cruise throttle (TH). The cruise throttle is set so that it has a relation between the throttle opening and the vehicle speed as shown in FIG. 11.

When judged at step S7 that the predetermined time has passed from the cruise TH output, it goes to step S8 and is judged whether the intervehicular mode of the first preceding vehicle is 3, and goes to step S9 and is judged whether the intervehicular mode of the second preceding vehicle is 3. When the intervehicular mode of the first or second preceding vehicle is 3, it goes to step S15 and sets the throttle opening to a value obtained by subtracting ΔTH from a present throttle opening (TH), wherein the lower limit of the throttle after subtracting ΔTH is idle throttle. Furthermore, when judged the intervehicular modes of the first and second preceding vehicles are not 3 respectively at steps S8 and S9, it goes to steps S10 and then to step S11 and is judged whether the intervehicular modes of the first and second preceding vehicles are 5 respectively. When the intervehicular mode of the first or second vehicle is not 5, it goes to step S13 and sets the throttle opening to the cruise throttle.

On the other hand, when judged that the intervehicular mode of the first or second preceding vehicle is 5 at steps S10 and S11 respectively, it goes to step S12 and is judged whether the acceleration of the own vehicle is lower than a predetermined value (upper limit of control acceleration at a time of cruise control). When judged it is lower than the predetermined value, it goes to step S14 and sets the throttle opening (TH) to a value obtained by adding ΔTH to the present throttle opening (TH). On the other hand, when judged at step S12 that it is not lower than the predetermined value, it is ended with skipping step S14.

Then, the gear ratio control (following) by the cruise control means 5 of the present embodiment will be described with respect to a flowchart of FIG. 20 and a map of FIG. 21.

First of all, judgments whether the accelerator is operated (step S1), whether the first brake is operated (step S2), whether the second brake is operated (step S3), and whether the vehicle speed is lower than a predetermined vehicle speed (creep control upper limit vehicle speed) (step S4) are performed. When the accelerator is operated, when the first or second brake means is operated, or when the vehicle speed is lower than the predetermined vehicle speed, all these cases go to step S10 and the Target ratio is set on the basis of the gear ratio map shown in FIG. 15.

On the other hand, when the accelerator is not operated, when the first and second brake means 1 and 2 are not operated, and when the vehicle speed is not lower than the predetermined vehicle speed, it goes to step S5 and is judged whether the intervehicular mode relative to the first preceding vehicle is 1, 2 or 3. When the intervehicular mode relative to the first preceding vehicle is not 1, 2 or 3, it goes to step S6 and is judged whether the intervehicular mode relative to the second preceding vehicle is 1, 2 or 3. When judged at step S5 that the intervehicular mode relative to the first preceding vehicle is 1, 2 or 3, it goes to step S7 with skipping step S6.

When judged at step S6 that the intervehicular mode relative to the second preceding vehicle is 1, 2 or 3, it goes to step S7 and is judged whether the throttle opening is smaller than a predetermined value. When judged it is smaller than the predetermined value, it goes to step S8 and is judged whether the deceleration of the own vehicle is larger than 0 (i.e. whether the own vehicle is under deceleration). When judged the intervehicular mode relative to the second preceding vehicle is not 1, 2 or 3 at step S6 and when the throttle opening is larger than the predetermined value at step S7, it goes to step S10. In addition, when judged the deceleration of the own vehicle is not larger than 0 (zero), it goes to step S9 and sets the Target ratio to a value obtained by adding Δratio to a present Target ratio. When the deceleration of the own vehicle is larger than 0 (zero), it is ended with skipping step S9.

Then, the braking force control (following) by the cruise control means 5 of the present embodiment will be described with respect to a flowchart of FIG. 22 and a map of FIG. 23.

First of all, judgments whether the accelerator is operated (step S1), whether the first brake is operated (step S2) and whether the second brake is operated (step S3) are performed. When the accelerator is operated or when the first or second brake means is operated, it goes to step S12 and sets a value of BRAKE to 0 (zero) (i.e. makes the brake actuator 14 (FIG. 2) not operate).

On the other hand, when the accelerator is not operated and when the first and second brake means 1 and 2 are not operated, it goes to step S4 and is judged whether the value of BRAKE is set to BRAKE 1. When judged that the value of BRAKE is set to BRAKE 1, it goes to step S5 and is judged whether the body inclination of the own vehicle has changed from 0 (zero) to 1 (i.e. whether the own vehicle has been inclined). When judged at step S5 that the body inclination of the own vehicle has changed from 0 (zero) to 1, it is judged that the vehicle approach avoiding operation has been performed and goes to step S12. On the other hand, when judged at step S5 that the body inclination of the own vehicle has not changed from 0 (zero) to 1, it goes to step S6 and is judged whether the intervehicular mode of the first preceding vehicle is 1. When judged at step S4 that the value of BRAKE is not set to BRAKE 1, it goes to step S6 with skipping step S5.

When judged at step S6 that the intervehicular mode of the first preceding vehicle is 1, it goes to step S10 and sets a value of BRAKE by adding ΔBRAKE to a present value of BRAKE and when judged it is not 1, it goes to step S7 and is judged whether the intervehicular mode of the second preceding vehicle is 1. When judged at step S7 that the intervehicular mode of the second preceding vehicle is 1, it goes to step S10 and sets a value of BRAKE to a value obtained by adding ΔBRAKE to a value of present BRAKE (see FIG. 24). On the other hand, when judged at step S7 that the intervehicular mode of the second preceding vehicle is not 1, it goes to step S8 and is judged whether the intervehicular mode of the first preceding vehicle is 2.

In addition, when judged at step S8 that the intervehicular mode of the first preceding vehicle is 2, it goes to step S11 and sets a value of present BRAKE to BRAKE 1 (warning by weak braking) and when judged at step S8 that the intervehicular mode of the first preceding vehicle is not 2, it goes to step S9 and is judged whether the intervehicular mode of the second preceding vehicle is 2. When judged at step S9 that the intervehicular mode of the second preceding vehicle is 2, it goes to step S11 and sets a value of present BRAKE to BRAKE 1 (warning by weak braking) and when judged at step S9 that the intervehicular mode of the second preceding vehicle is not 2, it goes to step S12 and sets a value of BRAKE to 0 (zero) (preventing operation of the brake actuator 14).

Then, the clutch control by the cruise control means 5 of the present embodiment will be described with respect to a flowchart of FIG. 25.

First of all, it is judged at step S1 that vehicle speed (own vehicle's speed) is lower than a predetermined vehicle speed (upper limit vehicle speed of creep control). When it is not lower than the predetermined vehicle speed, the clutch K is controlled under a travel state at step S3. The clutch torque capacity (TC) of the clutch K is shown in FIG. 26. When judged at step S1 that it is lower than the predetermined vehicle speed, it is judged at step S2 whether the accelerator operation is performed. When the accelerator is operated, it goes to step S3 to control for the clutch K to perform the normal clutch traveling and when the accelerator is not operated, it goes to step S4 to control the clutch K performing the creep.

Then, the clutch control on the creep of the present embodiment will be described with respect to a flowchart of FIG. 27.

As previously described, the creep control is a control for driving a vehicle under idling state of a driving power source E without accelerator operation to enable a low speed traveling without the accelerator operation. As shown in FIG. 26, the creep control is a control performed by setting a clutch position angle to ΘC1 so that the clutch torque capacity (TC) becomes a predetermined value.

First of all, it is judged at step S1 whether a predetermined period of time has elapsed from an output to an actuator for setting the clutch position angle (ΘC1). When it has not elapsed yet, it goes to step S9 and sets an initial clutch position angle (ΘC=ΘC1) in the creep control and when it has already elapsed, a feedback control for the creep control (i.e. feedback control for keeping the idle rotation of the driving power source and feedback control for keeping the clutch torque capacity) is started.

The feedback control for keeping the idle rotation is as follows. That is, it is performed by a judgment whether the idle rotation of the driving power source E is higher than a predetermined value 1 (step S2) and by a judgment whether the idle rotation of the driving power source E is lower than a predetermined value 2 (step S3). When the idle rotation of the driving power source E is higher than a predetermined value 1 at step S2 (e.g., an engine idle rotation is higher than a target rotation), it goes to step S5 and reduces the idle rotation (Idle TH=Idle TH−ΔTH), and when the idle rotation of the driving power source E is lower than a predetermined value 2 at step S3 (e.g., an engine idle rotation is lower than a target, it goes to step S6 and increases the idle rotation (Idle TH=Idle TH+ΔTH).

On the other hand, the feedback control for keeping the clutch torque capacity is as follows. That is, it is judged whether fuel (injection fuel) supplied to the driving power source E is larger quantity than a predetermined value (step S4). When the quantity of injection fuel is not larger than a predetermined value, it goes to step S8 and sets the clutch position angle to a value (ΘC−ΔΘC) obtained by subtracting a minute angle (ΔΘC) from the clutch position angle (ΘC) to increase the clutch torque capacity (e.g., to move the clutch position in a clutch contact direction), and when the quantity of injection fuel supplied to the driving power source E is larger than a predetermined value, it goes to step S7 and sets the clutch position angle to a value (ΘC+ΔΘC) obtained by adding a minute angle (ΔΘC) to the clutch position angle (ΘC) to reduce the clutch torque capacity (e.g., the move the clutch position in a clutch release direction).

Then, the clutch control on traveling of the present embodiment will be described with respect to a flowchart of FIG. 28.

As previously described, the clutch control on traveling is a control for traveling or starting the vehicle on the basis of accelerator operation etc. First of all, it is judged at step S1 whether the clutch differential rotation is within a predetermined value. When judged it is within the predetermined value, it is judged the travel will be performed and goes to step S7 to set the clutch position angle to 0 (zero) (clutch K: ON). On the other hand, when the clutch differential rotation is not within a predetermined value, it goes to step S2 and is judged whether a predetermined period of time has elapsed from an output to the actuator for setting the clutch position angle (ΘC2).

When judged at step S2 that the predetermined period of time has not elapsed yet, it is judged that the start control will be performed and sets the initial clutch position angle in the start control (ΘC=ΘC2) at step S4. On the other hand, when judged that the predetermined period of time has already elapsed, the feedback control for control on travel is started. The feedback control on travel is as follows. That is, it is judged at step S3 whether the engine rotation is higher than a predetermined value. When it is higher than the predetermined value, the clutch position angle is set to a value obtained by subtracting a minute angle (ΔΘC) from the clutch position angle (ΘC) at step S5 to increase the clutch torque capacity (e.g., movement of the clutch in the clutch contact direction). On the other hand, when the engine rotation is not higher than the predetermined value, the clutch position angle is set to a value (ΘC+ΔΘC) obtained by adding the minute angle (ΔΘC) to the clutch position angle (ΘC) at step S6 to reduce the clutch torque capacity (e.g., movement of the clutch in the clutch release direction to, for example, avoid engine stop).

Then, the second embodiment of the present inventions will be described.

Similarly to the first embodiment, a saddled vehicle of this embodiment is a type also driven by a driver sitting on a saddle seat with steering a handlebar as shown FIGS. 33 and 34 and comprises a driving power source (engine) E, a handlebar H, two operation means for performing a braking operation including a first brake means 1 (which can serve as a first brake) and a second brake means 2' (which can serve as a second brake), a transmission Z formed of a stepwise transmission, a clutch K, an driving power source ECU 3 as an engine control means (which can serve as an engine controller), and a transmission ECU 4. Same reference numerals are used also in the second embodiment as those used in the first embodiment and detailed description of them will be omitted.

In the two-wheeled vehicle of the present embodiment, the second brake means 2' is configured to be operated by a driver's foot is mounted. The second brake means 2' comprises a foot brake operated by a foot of driver sitting on the saddled seat and the two-wheeled vehicle can be braked by a rear wheel brake RB when the foot motion of a driver is detected by a brake operation detection sensor Sn2.

Similarly to the first embodiment, the transmission Z and the clutch K can be arranged in the middle of the power transmitting path from the driving power source E to the driving wheel D. The transmission Z can be a stepwise transmission provided with a dog clutch which can be automatically shifted to a predetermined gear step in accordance with modes set by the operation means 9 (which can serve as an operation device). The transmission Z can be controlled by the gear ratio control means 6 (which can serve as a gear ratio control device) and adapted to transmit the driving power of the driving power source E to the driving wheel D when it is set to D range ($1^{st}$ gear ⇔ $2^{nd}$ gear ⇔ $3^{rd}$ gear ⇔ $4^{th}$ gear automatic gear shift in this embodiment) and not to transmit the driving power of the driving power source E to the driving wheel D when it is set to N range.

As shown in FIG. 34, the transmission ECU 4 can be further electrically connected to the vehicle speed sensor Sn7 and a shift drum angle sensor Sn12 for detecting states of the dog clutch (states of transmission and interruption of power) from the rotation angle of a shift drum Za of the transmission Z to determine states of the vehicle speed and the dog clutch. A reference numeral Sn4 denotes an engine rotation sensor electrically connected to the driving power source ECU 3.

Similarly to the first embodiment, the cruise control means 5 (which can serve as a cruise control device) can be configured so that it obtains a forward intervehicular distance Y which is a distance relative to the preceding vehicle in a traveling direction and a side intervehicular distance X which is a distance relative to the preceding vehicle in a vehicle width direction and can perform the cruise control in accordance with the forward intervehicular distance Y and the side intervehicular distance X. Accordingly, it is possible to perform the cruise control utilizing the basic characteristics and the vehicle approach avoiding performance of the saddled vehicle steered by a handlebar H such as a motorcycle in this embodiment.

Also similarly to the first embodiment, the cruise control means 5 of this embodiment judges a plurality of vehicles traveling in the same traffic lane as preceding vehicles and cruise controls the own vehicle relative to the preceding vehicles in accordance with respective forward intervehicular distances Y and side intervehicular distances X. This makes it possible to shorten a row of vehicles when a plurality of vehicles travel in a same traffic lane if traveling in two alternate rows of two longitudinal rows as compared with a single longitudinal row travel in a same traffic lane. In the description of the present inventions, although a plurality of vehicles traveling in two alternate rows are shown as the preceding vehicles, the cruise control of the present inventions may be applied to a single vehicle traveling in a same traffic lane as that of the own vehicle.

Although it is described the saddled vehicle of the present embodiments, the present inventions are not limited to the described and illustrated embodiments. For example, it may be possible to use other means (e.g. an exclusive switch for cruise control) different from the operation means 9 as means for starting the cruise control. In addition, in place of obtaining the forward intervehicular distances and the side intervehicular distances relative to the preceding vehicle by the cruise control means 5, it is possible to obtain other parameters (e.g. respective distances from a virtual point on a traffic lane) exhibiting relations between the own vehicle and the preceding vehicle(s) by the cruise control means 5. This makes it possible to substantially judge the side intervehicular distances between the own vehicle and the preceding vehicle(s). In addition, the control degree of the cruise control means 5 may be other control degrees used for cruise control such as relative speed, relative acceleration, approach spare time etc. relative to the preceding vehicle in place of the preset intervehicular distance. Furthermore, although it is described that the driving power source E is an engine (internal combustion engine), it may be possible to use other driving power source such as an electric motor etc. In addition, the saddled vehicle of the present inventions is not limited to the described and illustrated two-wheeled vehicle and thus may be applied to any other types of vehicles such as those driven by a driver sitting on a saddled seat and steered by a handlebar.

The present inventions can be applied to other saddled vehicles although having different appearances and other functions than that described in this application if they are saddled vehicles having a cruise control means which can detect a forward intervehicular distance which is a distance relative to the preceding vehicle in a traveling direction and a side intervehicular distance which is a distance relative to the preceding vehicle in a vehicle width direction and perform the cruise control in accordance with the forward intervehicular distance and the side intervehicular distance.

What is claimed is:

1. A saddled vehicle driven by a driver sitting on a saddle seat with steering a handlebar comprising:
   a detection means for detecting a traffic lane in which the saddled vehicle driven by the driver is traveling and for detecting other vehicles; and
   a cruise controller for identifying a preceding vehicle in the same traffic lane as the saddled vehicle driven by the driver from among the detected other vehicles and for performing automatic travel control of the saddled vehicle driven by the driver such that the saddled vehicle driven by the driver follows the preceding vehicle at a preset intervehicular distance relative to the preceding vehicle, wherein the saddled vehicle driven by the driver and the preceding vehicle are sized to allow side-by-side travel within the same traffic lane;
   wherein the cruise controller is configured to obtain a forward intervehicular distance which is a distance from the saddled vehicle driven by the driver to the preceding vehicle in a traveling direction and a side intervehicular distance, wherein the side intervehicular distance is a distance between the saddled vehicle driven by the driver and the preceding vehicle in a direction that is orthogonal to the traveling direction of the saddled vehicle, and wherein the cruise controller performs the automatic travel control of the saddled vehicle driven by the driver in accordance with the forward intervehicular distance and the side intervehicular distance.

2. The saddled vehicle of claim 1 wherein the cruise controller is configured to control the saddled vehicle driven by the driver to maintain the forward intervehicular distance when cruise controlling relative to the preceding vehicle such that the forward intervehicular distance is larger relative to a first preceding vehicle having a first side intervehicular distance that is larger than a predetermined value compared to the forward intervehicular distance that is maintained when cruise controlling relative to a second preceding vehicle that has a second side intervehicular distance that is smaller than the predetermined value.

3. The saddled vehicle of claim 1 wherein the cruise controller is configured to control the saddled vehicle driven by the driver such that the saddled vehicle maintains the forward intervehicular distance to be larger than zero when cruise controlling relative to the preceding vehicle having the side intervehicular distance larger than a predetermined value.

4. The saddled vehicle of claim 3 wherein cruise controller is configured to control the saddled vehicle driven by the driver such that the forward intervehicular distance of the saddled vehicle driven by the driver is allowed to become zero when a speed of the saddled vehicle driven by the driver is lower than a predetermined value when cruise controlling relative to the preceding vehicle having the side intervehicular distance larger than a predetermined value.

5. The saddled vehicle of claim 1 wherein the detection means is configured to detect a width of the preceding vehicle and the cruise controller is configured to perform automatic travel control of the saddled vehicle driven by the driver to establish the forward intervehicular distance such that the forward intervehicular distance is larger relative to a first preceding vehicle having a larger width detected by the detection means compared to a second preceding vehicle having a smaller width detected by the detection means.

6. The saddled vehicle of claim 1 wherein the detection means is configured to detect an inclination angle of the preceding vehicle, wherein the inclination angle is defined between a rear tire of the preceding vehicle and a vertical line that is perpendicular to a surface of the traffic lane, and wherein the cruise controller is configured to set the forward intervehicular distance such that the forward intervehicular distance is larger relative to a first preceding vehicle having a larger inclination angle detected by the detection means compared to the forward intervehicular distance relative to a second preceding vehicle having a smaller inclination angle detected by the detection means.

7. The saddled vehicle of claim 1 wherein the cruise controller is configured to judge whether the automatic travel control of the saddled vehicle driven by the driver is stably performed for a predetermined period of time, wherein stably performed is determined based on whether a variation range of a speed of the saddled vehicle is smaller than a predetermined value for the predetermined period of time, and to change the forward intervehicular distance such that a smaller forward intervehicular distance is set if the cruise controller judges that the automatic travel control of the saddled vehicle driven by the driver is stably performed for a predetermined period of time.

8. The saddled vehicle of claim 1 wherein the saddled vehicle driven by the driver is configured to warn the driver when the forward intervehicular distance becomes smaller than a predetermined value relative to the preceding vehicle and when the side intervehicular distance relative to the preceding vehicle is smaller than a second predetermined value.

9. The saddled vehicle of claim 8 wherein the warning is performed by operating the brake of the saddled vehicle.

10. The saddled vehicle of claim 8 wherein the detection means is configured to detect an inclination angle of the saddled vehicle driven by the driver, wherein the inclination angle of the saddled vehicle is defined between a line indicating a surface of the traffic lane and a bottom horizontal image frame of the detection means, and wherein the saddled vehicle judges whether a vehicle approach avoiding operation by the saddled vehicle driven by the driver has been performed based on whether the inclination angle of the saddled vehicle detected by the detection means was increased larger than a predetermined value after the warning.

11. The saddled vehicle of claim 10 wherein the saddled vehicle warns the driver of the saddled vehicle unless the saddled vehicle judges that the vehicle approach avoiding operation by the saddled vehicle driven by the driver has been performed.

12. The saddled vehicle of claim 1 wherein only a rear wheel brake is operated when the forward intervehicular distance has become smaller than a predetermined value relative to the preceding vehicle having the side intervehicular distance smaller than a second predetermined value.

13. The saddled vehicle of claim 1 wherein the detection means is configured to determine that the traffic lane of the traveling direction is curved based on detection by the detection means of a curved road side strip or center line, and wherein the cruise controller sets the forward intervehicular distance larger when cruise controlling the saddled vehicle in a curved traffic lane compared to when cruise controlling the saddled vehicle in a straight traffic lane.

14. The saddled vehicle of claim 1 wherein the cruise controller is configured to identify a plurality of vehicles traveling in the same traffic lane as preceding vehicles and is configured to control the saddled vehicle driven by the driver relative to the preceding vehicles in accordance with forward intervehicular distances and side intervehicular distances relative to the plurality of preceding vehicles.

15. The saddled vehicle of claim 1 wherein a creep control is performed by controlling a clutch under conditions of no accelerator operation and idling of a driving power source when a speed of the saddled vehicle is lower than a predetermined value.

16. A saddled vehicle driven by a driver sitting on a saddle seat with steering a handlebar comprising:
a sensor configured to detect a traffic lane in which the saddled vehicle driven by the driver travels and to detect other vehicles; and
a cruise controller configured to identify a preceding vehicle in the same traffic lane as the saddled vehicle driven by the driver from among the detected other vehicles and to automatically control at least acceleration and braking of the saddled vehicle driven by the driver such that the saddled vehicle driven by the driver follows the preceding vehicle and maintains a preset intervehicular distance relative to the preceding vehicle, wherein the saddled vehicle driven by the driver and the preceding vehicle are sized to allow side-by-side travel within the same traffic lane;

wherein the cruise controller is configured to:

determine a forward intervehicular distance which is a distance from the saddled vehicle driven by the driver to the preceding vehicle as measured in a traveling direction, based on a signal from the sensor;

determine a side intervehicular distance which is a distance between the saddled vehicle driven by the driver and the preceding vehicle in a direction that is orthogonal to the traveling direction of the saddled vehicle, based on a signal from the sensor; and automatically control at least acceleration and braking of the saddled vehicle driven by the driver based upon the obtained forward intervehicular distance and the obtained side intervehicular distance.

17. The saddled vehicle of claim 16, wherein the sensor is at least one of an image sensor and a radar sensor.

* * * * *